US009640122B2

(12) United States Patent
Ono

(10) Patent No.: US 9,640,122 B2
(45) Date of Patent: May 2, 2017

(54) LIQUID CRYSTAL DISPLAY DEVICE AND DRIVING METHOD THEREOF

(71) Applicant: Panasonic Liquid Crystal Display Co., Ltd., Himeji-shi, Hyogo (JP)

(72) Inventor: Kikuo Ono, Ibaraki (JP)

(73) Assignee: Panasonic Liquid Crystal Display Co., Ltd., Hyogo (JP)

( * ) Notice: Subject to any disclaimer, the term of this patent is extended or adjusted under 35 U.S.C. 154(b) by 368 days.

(21) Appl. No.: 14/199,443

(22) Filed: Mar. 6, 2014

(65) Prior Publication Data

US 2014/0285478 A1 Sep. 25, 2014

(30) Foreign Application Priority Data

Mar. 22, 2013 (JP) .................................. 2013-060133

(51) Int. Cl.
*G06F 3/08* (2006.01)
*G09G 5/00* (2006.01)
*G09G 3/36* (2006.01)
*G02F 1/1343* (2006.01)
*G02F 1/1362* (2006.01)

(52) U.S. Cl.
CPC ......... *G09G 3/3614* (2013.01); *G02F 1/1362* (2013.01); *G02F 1/134363* (2013.01); *G02F 2001/136218* (2013.01); *G09G 2300/0434* (2013.01)

(58) Field of Classification Search
CPC ............. G02F 1/134363; G02F 1/1362; G02F 2001/136218; G09G 2300/0434; G09G 3/3614
See application file for complete search history.

(56) References Cited

U.S. PATENT DOCUMENTS

2003/0086045 A1*  5/2003  Ono ................... G02F 1/134309
                                                                349/141
2009/0128757 A1   5/2009  Koshihara et al.
(Continued)

FOREIGN PATENT DOCUMENTS

JP      11-271789        10/1999
JP      2009-122569       6/2009
(Continued)

*Primary Examiner* — Kumar Patel
*Assistant Examiner* — Insa Sadio
(74) *Attorney, Agent, or Firm* — Hamre, Schumann, Mueller & Larson, P.C.

(57) ABSTRACT

Provided is a liquid crystal display device, including a first and second substrates, the second substrate including data signal lines, gate signal lines, pixel electrodes, a plurality of common electrodes that extend in one of a column direction and a row direction, and a plurality of shield electrodes overlapping at least one of the data signal lines or the gate signal lines, the plurality of common electrodes including a first common electrode to which a first voltage is supplied and a second common electrode to which a second voltage is supplied, the first common electrode and the second common electrode being alternately arranged in one of the row direction and the column direction, in which, in plan view, each of the plurality of shield electrodes is formed to overlap at least a gap formed between the first common electrode and the second common electrode that are adjacent to each other.

16 Claims, 18 Drawing Sheets

(56) References Cited

U.S. PATENT DOCUMENTS

| | | | |
|---|---|---|---|
| 2009/0296037 A1 | 12/2009 | Tanaka et al. | |
| 2011/0085121 A1 | 4/2011 | Jeon et al. | |
| 2011/0205478 A1 | 8/2011 | Nakahara et al. | |
| 2012/0086654 A1* | 4/2012 | Song | G06F 3/0412 345/173 |
| 2012/0127142 A1* | 5/2012 | Yoo | G09G 3/3614 345/208 |
| 2012/0257156 A1* | 10/2012 | Hiratsuka | G02F 1/134363 349/143 |
| 2012/0293756 A1* | 11/2012 | Matsumoto | G02F 1/134363 349/106 |

FOREIGN PATENT DOCUMENTS

| | | |
|---|---|---|
| JP | 2010-009004 | 1/2010 |
| JP | 2011-081385 | 4/2011 |
| JP | 2012-027046 | 2/2012 |
| JP | 2012-242796 | 12/2012 |

* cited by examiner

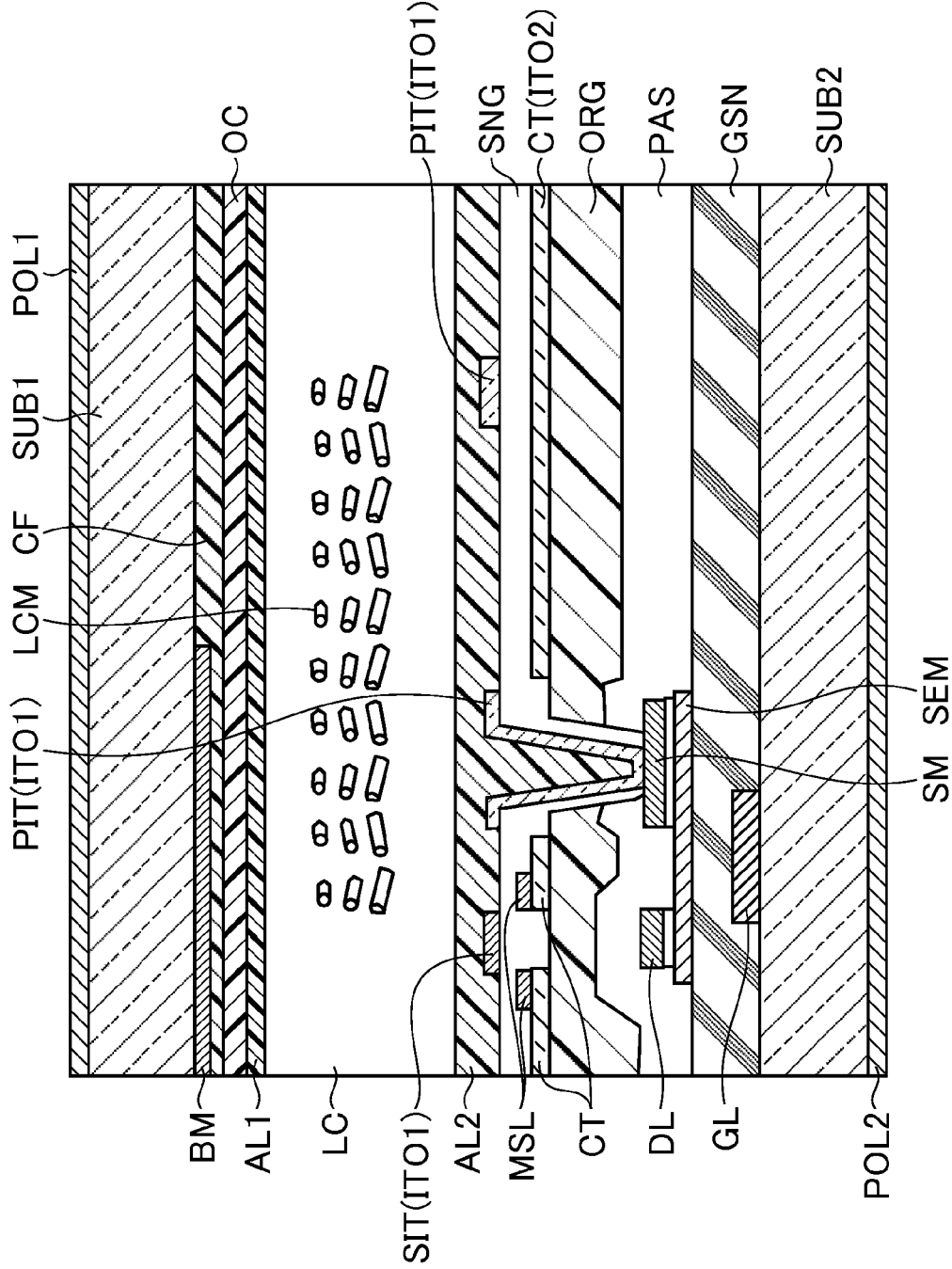

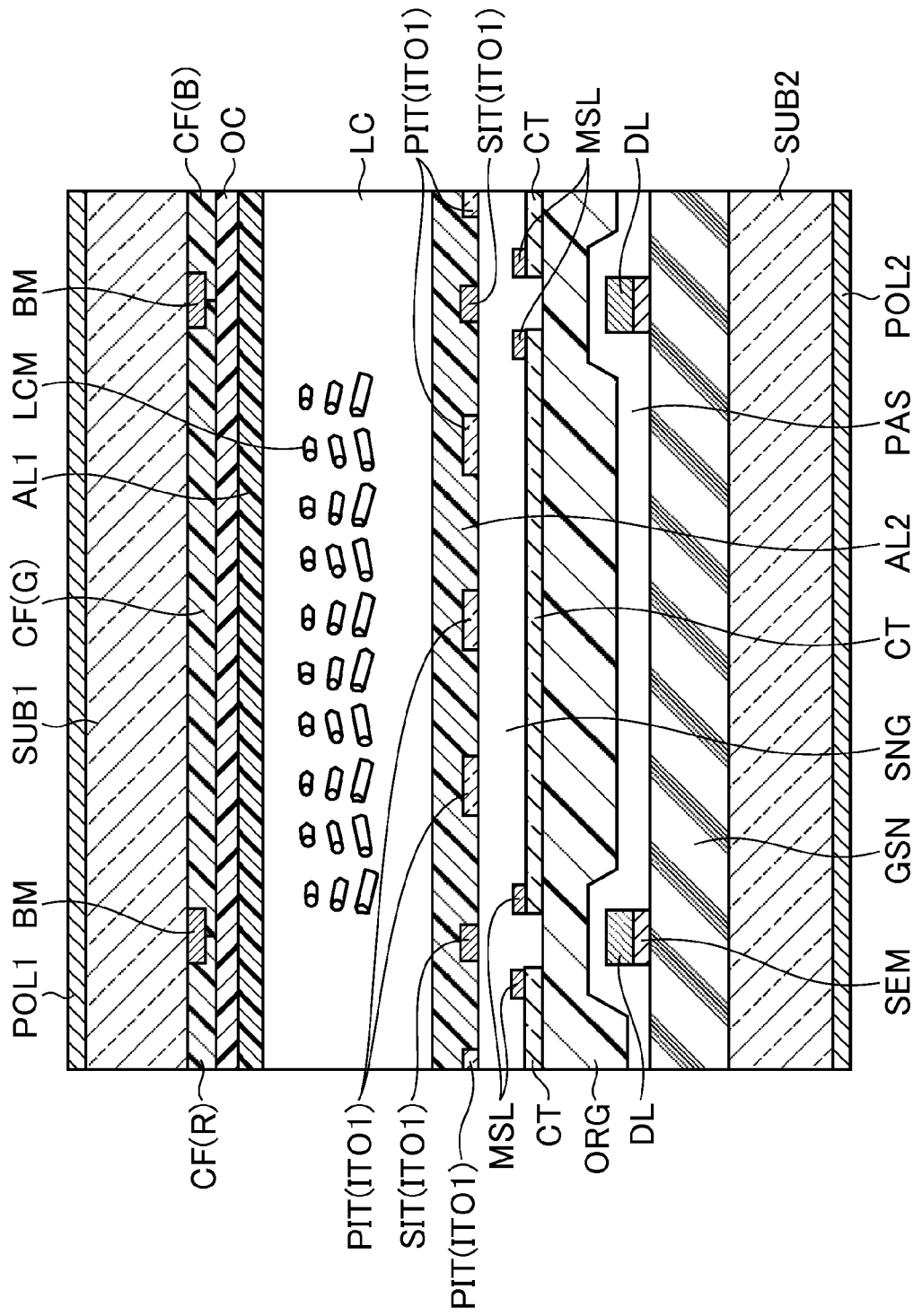

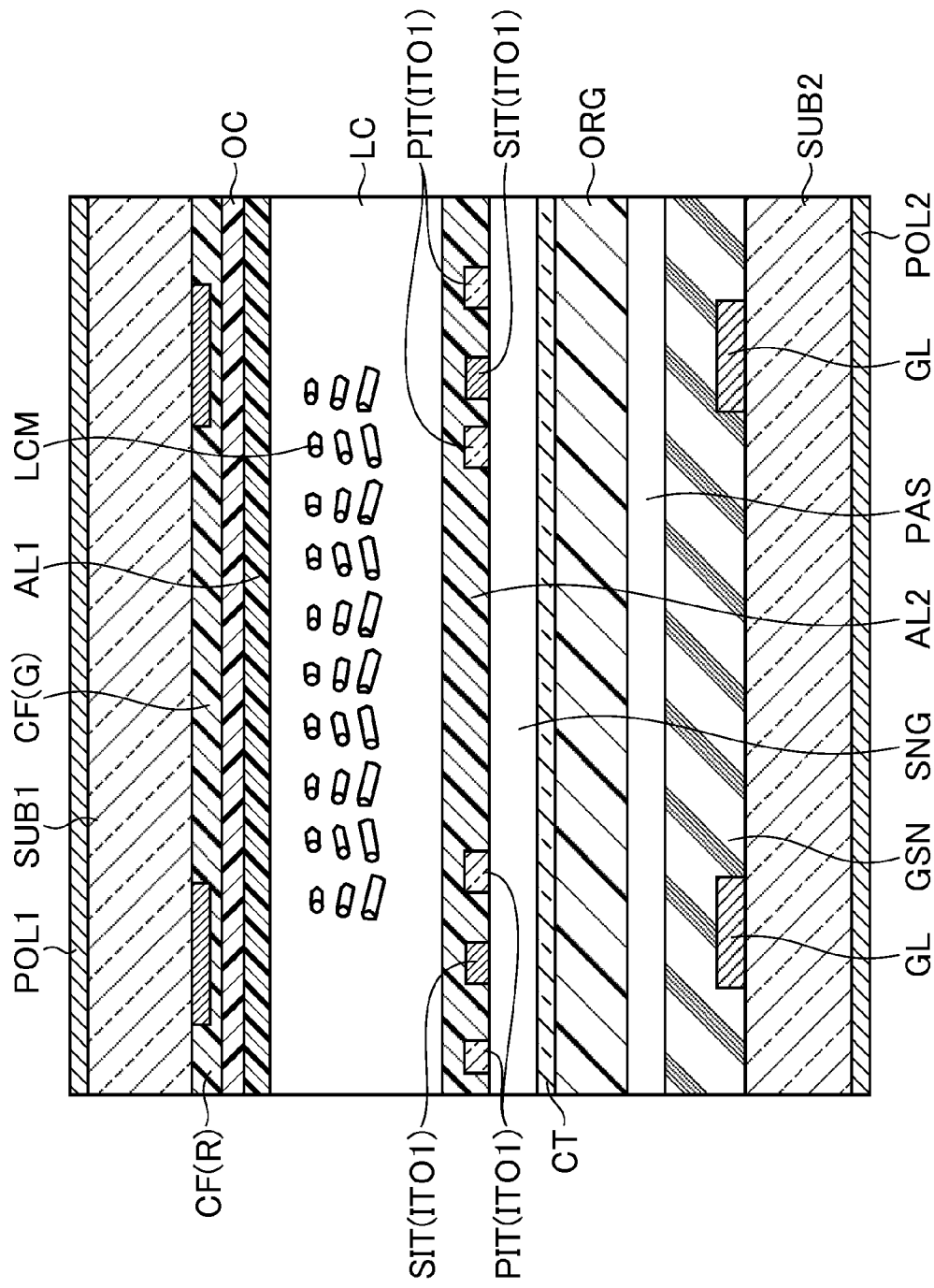

FIG.8A
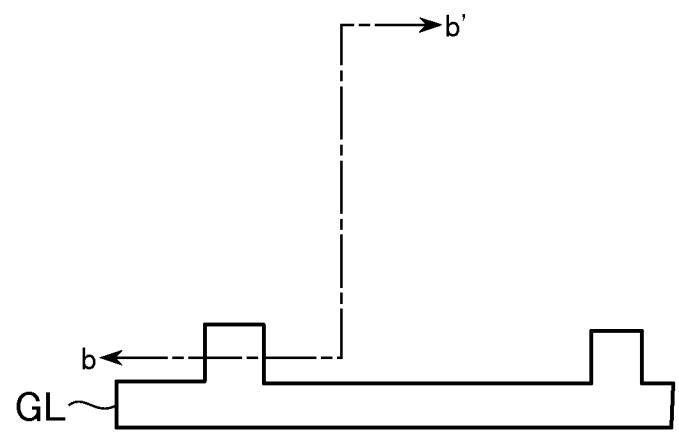
FIG.8B
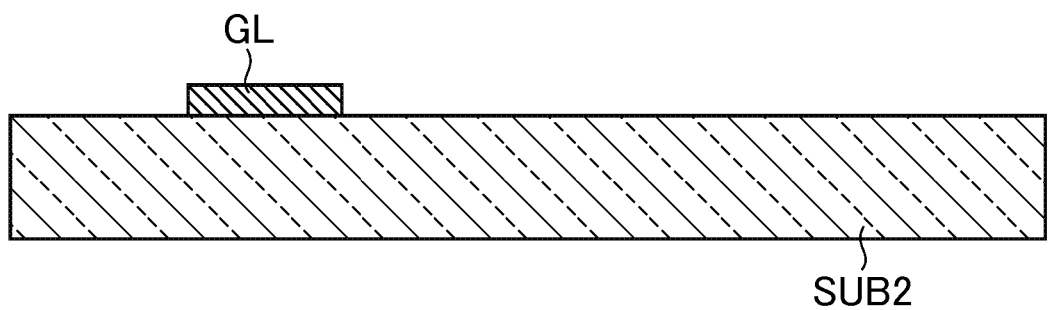

LIQUID CRYSTAL DISPLAY DEVICE AND DRIVING METHOD THEREOF

CROSS-REFERENCE TO RELATED APPLICATION

The present application claims priority from Japanese application JP2013-060133 filed on Mar. 22, 2013, the content of which is hereby incorporated by reference into this application.

TECHNICAL FIELD

The present application relates to a liquid crystal display device, and more particularly, to a lateral electric field liquid crystal display device and a driving method therefor.

BACKGROUND

A lateral electric field liquid crystal display device includes, on one of a pair of substrates arranged so as to be opposed to each other via liquid crystal, a pixel electrode and a common electrode in each pixel region on the liquid crystal side. In this configuration, an electric field in a direction parallel to the substrate (lateral electric field) is generated between the pixel electrode and the common electrode so that the lateral electric field is applied to the liquid crystal to drive the liquid crystal. In this manner, the amount of light passing through the region between the pixel electrode and the common electrode is controlled to display an image. The lateral electric field liquid crystal display device is disclosed in, for example, Japanese Patent Application Laid-open No. 2010-9004.

The lateral electric field liquid crystal display device has an advantage in that display change is small even when the device is viewed from a direction oblique to a display surface, that is, the device is excellent in so-called wide viewing angle characteristics.

SUMMARY

However, in the related-art lateral electric field liquid crystal display device, the common electrode is formed into a solid shape provided in common to the respective pixel regions. Therefore, a voltage of the common electrode (common voltage) is set to a constant value. Therefore, a voltage to be supplied to the pixel electrode (data voltage) increases, which causes a problem of increase in power consumption.

The present invention has been made in view of the above-mentioned problem, and has an object to reduce power consumption in a lateral electric field liquid crystal display device.

In the general aspect, the present application describes a liquid crystal display apparatus that includes a first substrate on a display surface side and a second substrate on a rear surface side, which are arranged so as to be opposed to each other via liquid crystal, the second substrate comprising a plurality of data signal lines, a plurality of gate signal lines, a plurality of pixels arrayed in a row direction and a column direction, a plurality of pixel electrodes formed individually so as to correspond to the plurality of pixels, respectively, a plurality of common electrodes that extend in one of the column direction and the row direction and are arranged so as to be opposed to the plurality of pixel electrodes, and a plurality of shield electrodes overlapping, through intermediation of an insulating film, at least one of the plurality of data signal lines and the plurality of gate signal lines. The plurality of common electrodes include a first common electrode to which a first voltage is supplied and a second common electrode to which a second voltage different from the first voltage is supplied, the first common electrode and the second common electrode being alternately arranged in one of the row direction and the column direction. In plan view, each of the plurality of shield electrodes is formed to overlap at least a gap formed between the first common electrode and the second common electrode that are adjacent to each other.

The above general aspect may include one or more of the following features. Each of the plurality of common electrodes extends in the column direction in which the plurality of data signal lines may extend, and is formed for each pixel column. The first common electrode is formed in an odd column, and the second common electrode is formed in an even column.

Each of the plurality of common electrodes may extend in the row direction in which the plurality of gate signal lines extend, and is formed for each pixel row. The first common electrode is formed in an odd row, and the second common electrode is formed in an even row.

In plan view, the gap formed between the first common electrode and the second common electrode that are adjacent to each other may overlap corresponding one of the plurality of data signal lines.

In plan view, the gap formed between the first common electrode and the second common electrode that are adjacent to each other may overlap corresponding one of the plurality of gate signal lines.

The second substrate may further include a bridge electrode for connecting adjacent two of the plurality of shield electrodes to each other.

The plurality of shield electrodes may be arranged in a grid shape so as to overlap each of the plurality of data signal lines and the plurality of gate signal lines through intermediation of the insulating film.

The plurality of shield electrodes may be formed in the same layer as the plurality of pixel electrodes with the same material.

The plurality of shield electrodes may be formed in a floating state.

The liquid crystal display device may further include a light shielding material formed on an end portion of each of the plurality of common electrodes.

Each of the plurality of pixel electrodes may have an aperture portion formed therein.

The second substrate may include the plurality of gate signal lines, a gate insulating film, the plurality of data signal lines, an organic insulating film, an interlayer insulating film, the plurality of common electrodes, an interlayer insulating film, and the plurality of pixel electrodes and the plurality of shield electrodes formed in the same layer, which are laminated in the stated order from a glass substrate side.

In another general aspect, the present application describes that a driving method for a liquid crystal display device includes a first substrate on a display surface side and a second substrate on a rear surface side, which are arranged so as to be opposed to each other via liquid crystal. The second substrate includes a plurality of data signal lines, a plurality of gate signal lines, a plurality of pixels arrayed in a row direction and a column direction, a plurality of pixel electrodes formed individually so as to correspond to the plurality of pixels, respectively, and a plurality of common electrodes that extend in one of the column direction and the row direction and are arranged so as to be opposed to the plurality of pixel electrodes. The plurality of common electrodes include a first common electrode and a second common electrode that are alternately arranged in one of the row direction and the column direction. The driving method includes supplying a first voltage to the first common electrode and supplying a second voltage different from the first voltage to the second common electrode.

The driving method for a liquid crystal display device may further include inverting, for each pixel column, a polarity of a pixel voltage to be applied to each of the plurality of pixels.

The driving method for a liquid crystal display device may further include inverting, for each pixel row, a polarity of a pixel voltage to be applied to each of the plurality of pixels.

The driving method for a liquid crystal display device may further includes inverting, for every at least one frame, the polarity of the pixel voltage to be applied to each of the plurality of pixels.

BRIEF DESCRIPTION OF THE DRAWINGS

FIG. 5 is a sectional view taken along the line 5-5' of the liquid crystal display panel illustrated in FIG. 4.

FIG. 6 is a sectional view taken along the line 6-6' of the liquid crystal display panel illustrated in FIG. 4.

FIG. 7 is a sectional view taken along the line 7-7' of the liquid crystal display panel illustrated in FIG. 4.

FIG. 8A is a plan view illustrating a first step in a TFT manufacturing process in the liquid crystal display panel illustrated in FIG. 4.

FIG. 8B is a sectional view taken along the line b-b' of the liquid crystal display panel illustrated in FIG. 8A.

DETAILED DESCRIPTION

Embodiments of the present application are described below with reference to the drawings.

[First Embodiment]

Figure 1:
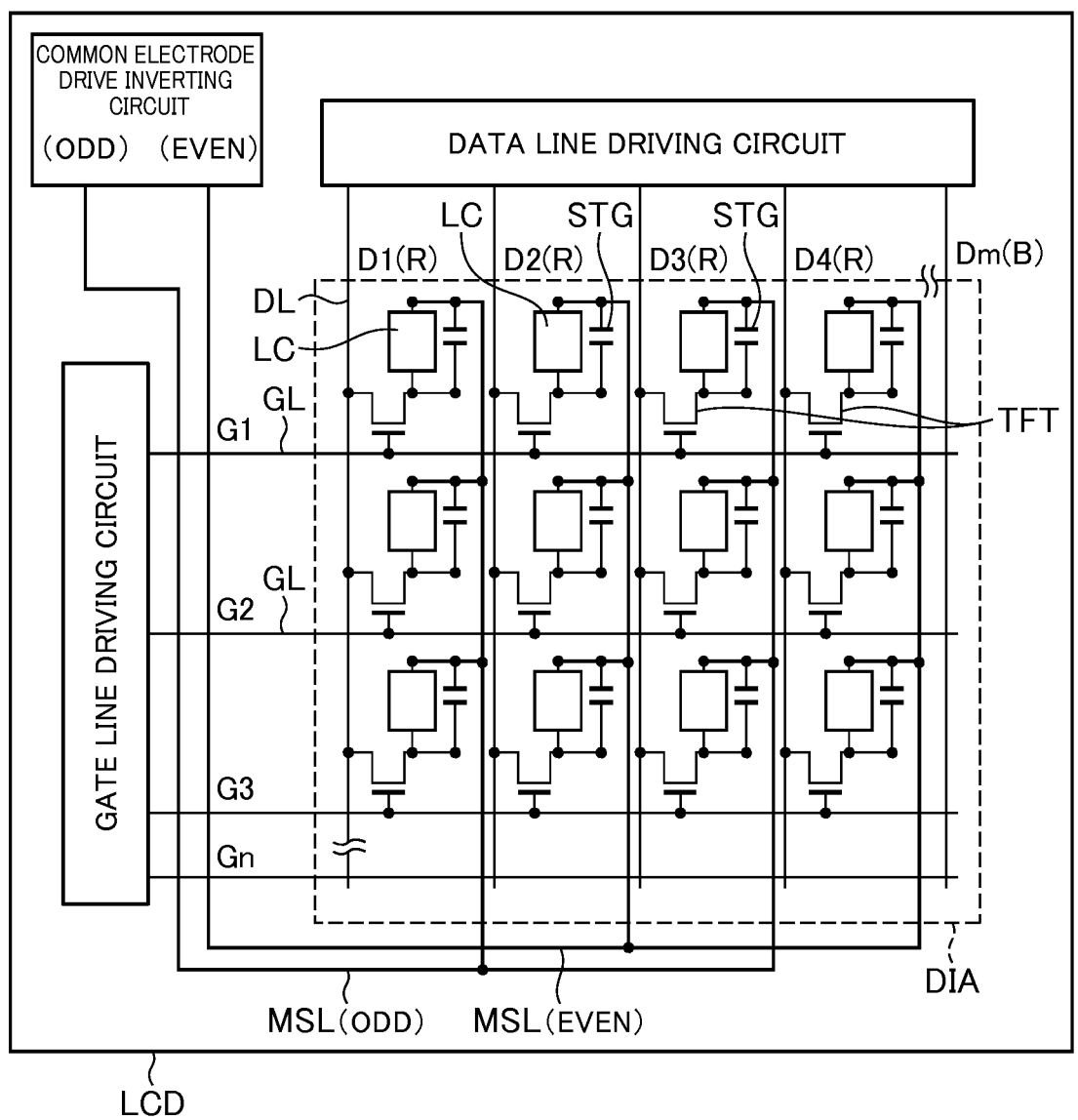
FIG. 1 is a diagram illustrating the entire configuration of a liquid crystal display device according to a first embodiment of the present application.

FIG. 1 is a diagram illustrating the entire configuration of a liquid crystal display device according to a first embodiment of the present application. A liquid crystal display device LCD includes a screen display region DIA and a driving circuit region for driving the screen display region DIA. The screen display region DIA includes a plurality of pixel regions arranged in matrix in a row direction and a column direction. The pixel regions perform active matrix display. Specifically, a gate voltage is supplied from a gate line driving circuit to gate signal lines G1, G2, and Gn, and a video data voltage is supplied from a data line driving circuit to data signal lines D1, D2, and Dm. The gate voltage turns on or off a thin film transistor TFT to supply the data voltage to a pixel electrode. An electric field generated between the data voltage supplied to the pixel electrode and a common voltage supplied from a common electrode drive inverting circuit drives a liquid crystal layer LC. In this manner, transmittance of light is controlled to display an image. In order to prevent voltage reduction in the liquid crystal layer LC, a storage capacitor STG is formed in each pixel region. The common voltage is supplied via common electrode metal wiring MSL connected to the common electrode drive inverting circuit to a transparent common electrode CT provided in the screen display region DIA.

In the active matrix arrangement in the screen display region DIA of the liquid crystal display device LCD according to this embodiment, the common electrode metal wiring MSL is collected for each of the odd column and the even column in a vertical direction (column direction) to be connected to the common electrode drive inverting circuit. Therefore, the common electrode drive inverting circuit has a configuration capable of simultaneously supplying common voltages having different polarities from each other to the odd column and the even column, that is, a common voltage having a positive polarity with respect to a center voltage and a common voltage having a negative polarity with respect to the center voltage.

Color display may be achieved by applying a desired data voltage to each of the data signal lines D1(R), D2(G), and D3(B) connected to pixels of red (R), green (G), and blue (B), which are formed of vertical-stripe color filters.

Figure 2A:
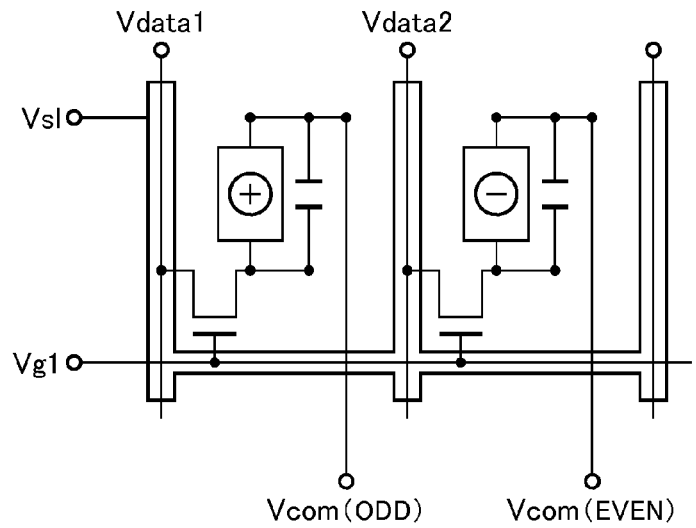
FIG. 2A is a diagram illustrating an equivalent circuit of a liquid crystal display panel in the liquid crystal display device illustrated in FIG. 1.
Figure 2B:
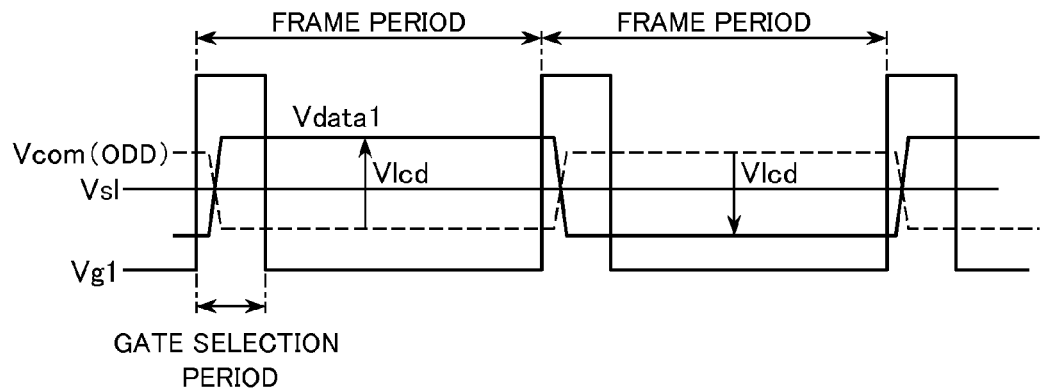
FIG. 2B is a timing chart of a drive voltage for a pixel in an odd column.
Figure 2C:
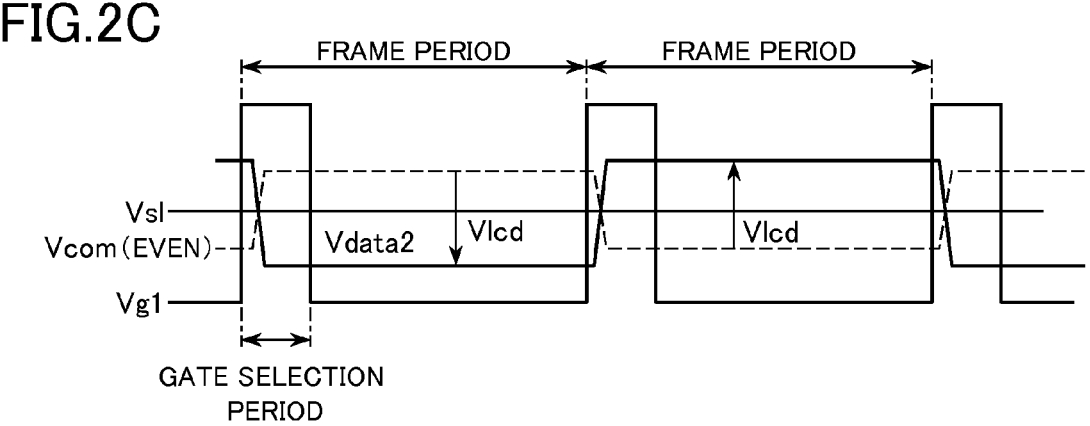
FIG. 2C is a timing chart of a drive voltage for a pixel in an even column.

FIG. 2A illustrates an equivalent circuit of two pixels adjacent to each other in the lateral direction, which are connected to a single gate signal line. FIGS. 2B and 2C illustrate timing charts of drive voltages for pixels in the odd column and the even column, respectively.

At terminals in the equivalent circuit of each pixel of FIG. 2A, a gate-on voltage Vg1 is applied to the gate signal line of the thin film transistor TFT, a data voltage Vdata1 is applied to the data signal line of the odd column, a data voltage Vdata2 is applied to the data signal line of the even column, Vcom(odd) is applied to the common electrode of the odd column, and Vcom(even) is applied to the common electrode of the even column. In the vicinity of the data signal line and the vicinity of the gate signal line, a shield voltage Vsl is applied as another voltage. In this embodiment, the common electrode is divided for each column. That is, the common electrode is divided above the data signal line, and hence the data signal line as a source of electric field noise cannot be shielded with the common electrode. Therefore, another fixed voltage (shield voltage Vsl) is applied to shield the data signal line.

A common gate signal line is used in the timing charts of FIGS. 2B and 2C, and hence a pulsed gate-on voltage Vg1 is simultaneously supplied to the gate signal line for pixels in the odd column and the even column. The liquid crystal display device LCD is an in-plane switching (IPS) (so-called lateral electric field) liquid crystal display device that exhibits black display when the data voltage is low and exhibits white display when the data voltage increases. The liquid crystal layer LC is driven when a liquid crystal drive voltage Vlcd corresponding to a difference voltage between a pixel voltage (substantially the data voltage) and the common voltage is applied thereto. FIGS. 2B and 2C are timing charts of voltages corresponding to white display.

In the timing chart of FIG. 2B, when the gate-on voltage Vg1 is applied during a first-half frame period, the data voltage becomes higher (positive) with respect to the center of the amplitude of the data voltage Vdata1, and simultaneously the common voltage Vcom(odd) becomes lower (negative) with respect to the center of the amplitude of the common voltage. The difference voltage Vlcd therebetween is applied to the liquid crystal layer LC. As described above, a voltage value obtained by adding the amplitude of the common voltage Vcom(odd) to the amplitude of the data voltage Vdata1 is applied to the liquid crystal layer LC to drive the liquid crystal layer LC. The data line driving circuit supplies the data voltage Vdata1 from a driver IC, and further is required to supply a display voltage in 256 levels besides the white display. Therefore, the cost of the data line driving circuit is high, and the cost of the data line driving circuit depends on the maximum voltage value. On the other hand, the amplitude of the common voltage is constant regardless of the display gray-scale. That is, binary voltages are only required to be supplied, and an inexpensive power amplifier may be used. When the common electrodes in the column direction are connected to each other and the common voltage is oscillated as in this embodiment, a lower data voltage can be used for drive, and hence the cost can be reduced. Further, as for the power consumption in the circuit system, the amplitude of the data voltage is larger than the amplitude of the common voltage, and hence, as a result, an effect of reduction in power consumption can be obtained due to the lowered data voltage.

The shield voltage Vsl is a center voltage of the amplitude of the common voltage Vcom(odd). Note that, in this embodiment, the common voltage Vcom(odd) of the odd column and the common voltage Vcom(even) of the even column each have the same amplitude center, and hence the shield voltage Vsl automatically becomes the center voltage as long as a shield electrode strongly capacitively-couples to (overlaps, through intermediation of an insulating film, with) the common electrode of the odd column or the even column. Therefore, the shield voltage Vsl is automatically settled to the above-mentioned center voltage without providing a special power supply. As described above, the shield electrode can be formed in a floating state, and hence a power supply and also connection wiring can be omitted. Thus, it is possible to obtain effects of cost reduction and elimination of connection failure.

The timing chart of FIG. 2C illustrates the voltage to be supplied to a pixel in the even column. In this case, the data voltage Vdata2 is negative in the first-half frame, and is positive in the latter-half frame. On the other hand, the common voltage Vcom(even) is positive in the first-half frame, and is negative in the latter-half frame. That is, the common voltages for the odd column and the even column oscillate so as to constantly have inverted polarities. Similarly, the data voltages for the odd column and the even column have polarities different from each other. This enables data voltage drive in column inversion (column line inversion). In this data voltage drive, the common voltage and the data voltage are oscillated in opposite directions to achieve lower voltage drive. In this manner, it is possible to provide the liquid crystal display device LCD that enables low power consumption at low cost.

Figure 3:
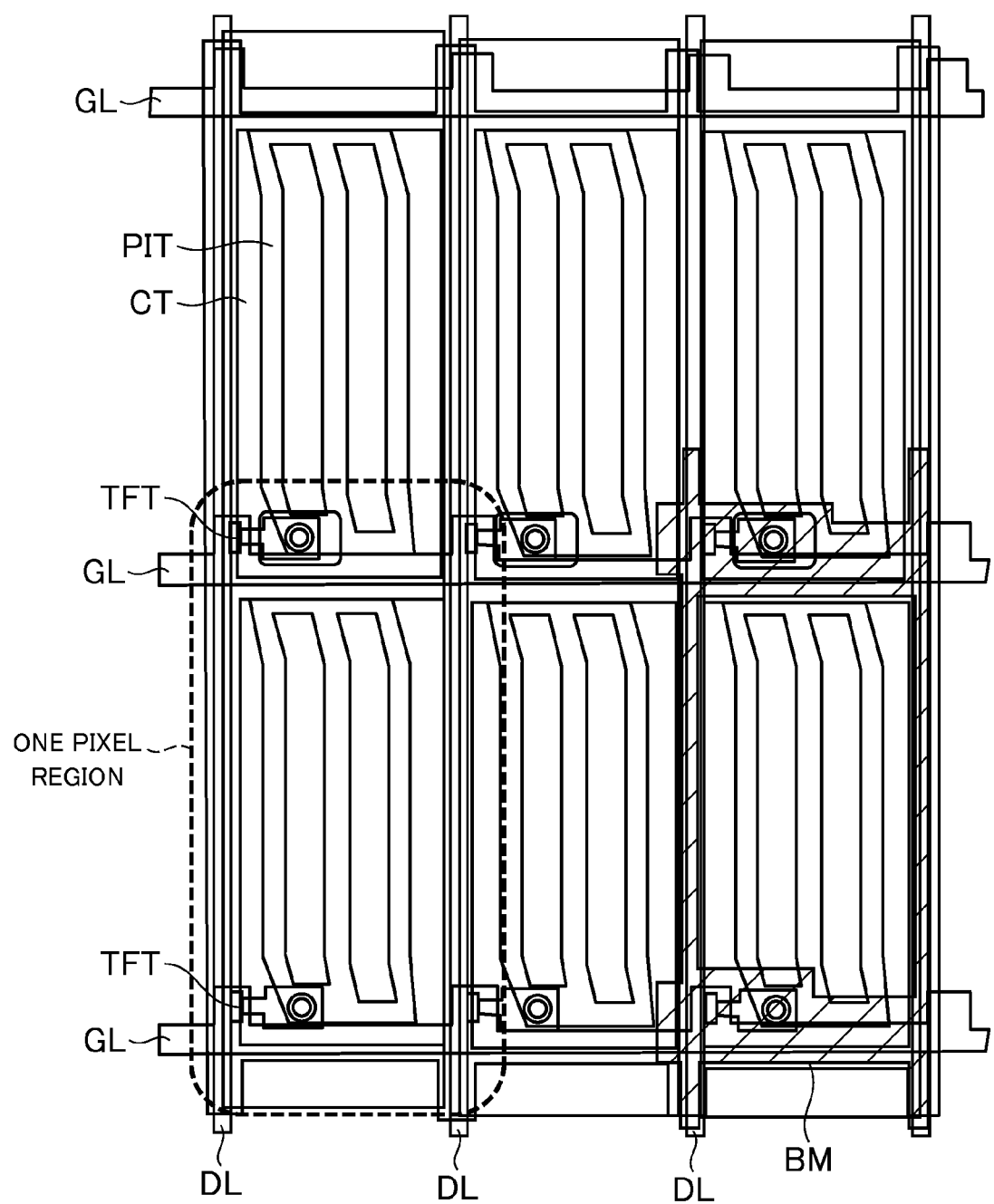
FIG. 3 is a plan view of a plurality of pixels of the liquid crystal display panel in the liquid crystal display device illustrated in FIG. 1.

FIG. 3 is a plan view extracting, from the liquid crystal display device LCD, three pixels arrayed in the lateral direction and two pixels arrayed in the vertical direction, that is, six pixels. A gate signal line GL is wiring for supplying a gate voltage to the thin film transistor TFT, and a data signal line DL is wiring for supplying a data voltage to the thin film transistor TFT. FIG. 3 illustrates, in one of the plurality of pixels, as an example, a planar configuration of a black matrix BM formed on a first substrate SUB1 on the display surface side. Upper surfaces of the data signal line DL, the gate signal line GL, and the thin film transistor TFT are covered with the black matrix BM having a light shielding effect. An aperture portion is formed at a center portion of the black matrix BM. By increasing the size (aperture ratio) of the aperture portion in a single pixel, it is possible to achieve a bright liquid crystal display device LCD with low power consumption.

Figure 4:
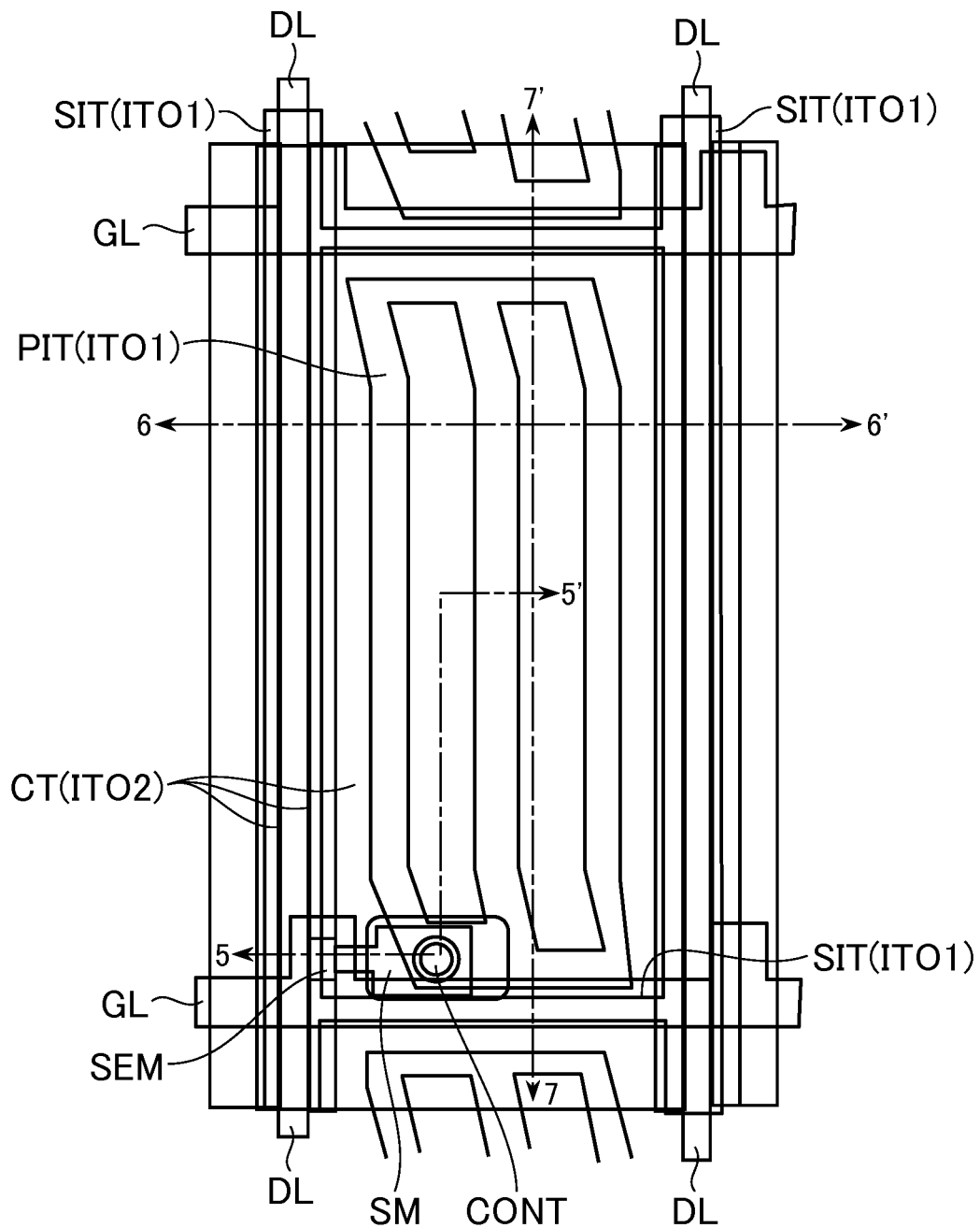
FIG. 4 is a plan view of a single pixel of the liquid crystal display panel in the liquid crystal display device illustrated in FIG. 1.

FIG. 4 is a detailed plan view of a single pixel, FIG. 5 is a sectional view taken along the line 5-5' of FIG. 4, FIG. 6 is a sectional view taken along the line 6-6' of FIG. 4, and FIG. 7 is a sectional view taken along the line 7-7' of FIG. 4.

FIG. 4 is a plan view of a region outlined by dotted lines of FIG. 3, which includes a single pixel surrounded by the thin film transistor TFT, the gate signal lines GL, and the data signal lines DL and adjacent surrounding pixels. The planar arrangement of the pixels and the function thereof are described below. The gate signal line GL is formed of a low resistance metal layer, and is connected to the gate line driving circuit of FIG. 1 to be supplied with the gate voltage. On the other hand, the data signal line DL is also formed of a low resistance metal layer, and is connected to the data line driving circuit of FIG. 1 to be supplied with the video data voltage. When the gate-on voltage is supplied to the gate signal line GL, a semiconductor layer SEM of the thin film transistor TFT decreases its resistance. The voltage of the data signal line DL is transmitted to a source electrode SM formed of a low resistance metal layer, and then is transmitted to a transparent pixel electrode PIT (ITO1) connected to the source electrode SM via a contact hole CONT. In this case, the transparent electrode is used not only as the pixel electrode PIT but also for connection to the outside of the liquid crystal display panel. Therefore, the material of the transparent electrode is referred to as ITO1.

As for the common voltage that is the other voltage to be applied to the liquid crystal layer LC, a voltage having an odd-side polarity is applied from the common electrode drive inverting circuit of FIG. 1 to the transparent common electrode CT (ITO2) of the pixel in the odd column, and a voltage having an even-side polarity is applied from the common electrode drive inverting circuit of FIG. 1 to the transparent common electrode CT (ITO2) of the pixel in the even column. The transparent common electrode CT is made of a second transparent electrode material ITO2. The transparent pixel electrode PIT is laminated on the transparent common electrode CT through intermediation of an insulating film. Further, the transparent pixel electrode PIT has a slit (aperture portion) formed in a display region of a single pixel. An electric field of the transparent pixel electrode PIT is applied through the slit to the liquid crystal layer for liquid crystal drive, and the electric field reaches the transparent common electrode CT to enable display. Note that, the shape of the slit is not particularly limited. The slit may have an elongated shape, or may be a general rectangular or elliptical aperture portion.

The transparent common electrode CT is divided for each data signal line DL in the vertical direction (column direction), and extends in the column direction across the gate signal line GL. Therefore, the transparent common electrode CT does not cover the data signal line DL from above. That is, in plan view, a gap between the adjacent transparent common electrodes CT overlaps the data signal line DL. When the data signal line DL is not covered with and shielded by a fixed voltage, the change of voltage sequentially sent from the data signal line DL enters the liquid crystal layer LC as electric field noise to cause malfunction. In order to prevent this malfunction, the width of the black matrix BM formed on the first transparent substrate SUB1 and above the data signal line DL needs to be increased. As a result, the aperture ratio is markedly decreased.

In view of this point, in the liquid crystal display device LCD according to this embodiment, a shield transparent electrode SIT formed by patterning and separating a film made of the first transparent electrode material ITO1, which is formed in the same step as the transparent pixel electrode PIT, is arranged above the data signal line DL. In this manner, a shielding effect can be improved, and a high aperture ratio can be maintained because it is unnecessary to increase the width of the black matrix BM. Further, the shield transparent electrode SIT can be formed in the same layer as the transparent pixel electrode PIT with the same material, and hence the manufacturing process of the liquid crystal display device LCD can be simplified.

The shield transparent electrode SIT is set in a state in which a center voltage of a voltage whose polarity is invertible is applied to each of the odd column and the even column or a floating state in which no voltage is applied thereto. Further, the voltage to be applied to the shield transparent electrode SIT may be set to a voltage slightly lower than the center voltage so that the flicker of the screen becomes minimum. The shield transparent electrode SIT is arranged so as to cover the data signal line DL and formed into a mesh shape (grid shape) in the entire screen display region DIA. With this, a large capacitive coupling is formed between the shield transparent electrode SIT and the transparent common electrodes CT of the odd column and the even column even when a voltage is not supplied to the shield transparent electrode SIT. Therefore, a constant value close to the amplitude center of the common voltage can be stably obtained, and the shielding effect can be maintained. Further, it is unnecessary to supply a voltage to the shield transparent electrode SIT, and hence increase in power consumption can be prevented. Note that, the shape of the shield transparent electrode SIT is not limited to the grid shape. For example, the shield transparent electrode SIT may be formed into a ladder shape by connecting adjacent shield electrodes to each other by a bridge electrode. The number of the bridge electrodes is not particularly limited, and the bridge electrode may be provided for every single pixel or for every plurality of pixels. When the bridge electrode is formed for every plurality of pixels, the aperture ratio can be more improved as compared to the case where the shield transparent electrode SIT is formed into a grid shape.

FIG. 5 is a sectional view taken along the line 5-5' of FIG. 4. Components, functions, and employed materials of the sectional structure of the pixel are described below. The liquid crystal layer LC is sandwiched between two transparent substrates, that is, the first transparent substrate SUB1 (first substrate) on the display surface side and a second transparent substrate SUB2 (second substrate) on the rear surface side. In the liquid crystal layer LC, positive liquid crystal molecules LCM whose long axes are aligned in the electric field direction are sealed. The liquid crystal layer LC has a thickness of 3 µm to 4 µm. The first transparent substrate SUB1 and the second transparent substrate SUB2 are made of glass. The thickness thereof is 0.4 mm to 0.7 mm in the manufacturing process, but after the liquid crystal layer LC is finally sealed, and the first transparent substrate SUB1 and the second transparent substrate SUB2 are chemically polished after being formed, the thickness may be reduced to about 0.2 mm. The present implementations are applicable even when plastic is used as the substrate material other than glass.

A first polarizing plate POL1 and a second polarizing plate POL2 are attached to the outer sides of the first transparent substrate SUB1 and the second transparent substrate SUB2, respectively. Light of a backlight unit is polarized by the second polarizing plate POL2 and enters the liquid crystal layer LC. In the liquid crystal layer LC, the light becomes elliptically polarized light due to an optical birefringence effect. After that, the light further becomes linear polarized light when the light passes through the first polarizing plate POL1 on the outer side of the first transparent substrate SUB1. In the liquid crystal display device LCD of this embodiment, the polarizing axes of the first polarizing plate POL1 and the second polarizing plate POL2 are provided orthogonal to each other (so-called cross-Nicol). Therefore, when an electric field is not applied to the liquid crystal layer LC (non-electric field state), the light of the backlight unit may pass through the liquid crystal layer LC, but is blocked by the first polarizing plate POL1. In this manner, black display is achieved. On the other hand, when a voltage is applied mainly between the transparent pixel electrode PIT and the transparent common electrode CT and thus an electric field is applied to the liquid crystal layer LC, the liquid crystal layer LC changes the light to elliptically polarized light by the birefringence operation, and the transmittance can be changed in accordance with the drive voltage. Therefore, a display range from gray-scale to white display is available.

In the liquid crystal layer LC, a first alignment film AL1 on the front surface side and a second alignment film AL2 on the rear surface side are formed, which can fix the liquid crystal molecules LCM. The alignment films AL1 and AL2 each contain polyimide as a main component. The surfaces of the alignment films AL1 and AL2 are subjected to rubbing processing or irradiated with a polarized ultraviolet ray, to thereby enable alignment of the liquid crystal molecules LCM. Color display is achieved by causing light to pass through a color filter CF formed on the first transparent substrate SUB1 and containing pigments as colored layers. Pigments may dissolve in the liquid crystal layer LC to become a stain source, and hence the surface of the color filter CF is covered with an overcoat film OC made of an organic material. The overcoat film OC also has an effect of planarizing the surface.

Depending on the type of the semiconductor layer SEM, when the semiconductor layer SEM is directly irradiated with outside light, the resistance of the semiconductor layer SEM may decrease, and thus the storage characteristics of the liquid crystal display device LCD may be lowered, which may inhibit satisfactory image display. Therefore, the black matrix BM is formed on the first transparent substrate SUB1 and above the semiconductor layer SEM. The black matrix BM is also arranged at a boundary between pixels of the color filter CF, to thereby prevent color mixture caused when light beams of adjacent pixels are viewed from an oblique direction. Thus, the black matrix BM provides such a great effect that an image can be displayed without blurring. Note that, when the width of the black matrix BM is too large, the aperture ratio and the transmittance are reduced. Therefore, in order to achieve bright and low power consumption characteristics in a high resolution liquid crystal display device, it is the greatest challenge to decrease the width of the black matrix BM as minimum as possible to the extent that color mixture is not caused when obliquely viewed. The black matrix BM is made of a resin material or a metal material using a black pigment.

In FIG. 5, similarly to the planar configuration, in a single pixel, the drive voltage is applied to one transparent pixel electrode PIT and the other transparent common electrode CT when the liquid crystal layer LC is assumed as a capacitor. First, a gate-on voltage is applied to the gate signal line GL formed of a metal layer. The gate signal line GL is made of a metal material containing aluminum (Al), molybdenum (Mo), titanium (Ti), or copper (Cu) as a main component, a plurality of laminate layers made of the above, an alloy obtained by adding tungsten (W) or manganese (Mn) to the above-mentioned metal material, or a laminate metal layer obtained by combining the above. The gate signal line GL has a thickness of 100 nm to 300 nm.

A gate insulating film GSN is formed on the gate signal line GL. The gate insulating film GSN is made of silicon nitride by plasma-enhanced chemical vapor deposition (CVD). Note that, in the liquid crystal display device LCD of this embodiment, the gate insulating film GSN may be made of silicon dioxide or alumina. The semiconductor layer SEM is arranged above the gate signal line GL, and is processed to have an island shape. The semiconductor layer SEM is made of amorphous silicon when combining with silicon nitride, and is made of oxide semiconductor or low-temperature polysilicon when combining with silicon dioxide. As oxide semiconductor, indium gallium zinc oxide may be used.

In order to take out current of the semiconductor layer SEM, the data signal line DL and the source electrode SM are formed. The data signal line DL and the source electrode SM are each formed of a low resistance metal material in the same step. The metal material may be a metal material containing aluminum (Al), molybdenum (Mo), titanium (Ti), or copper (Cu) as a main component, a plurality of laminate layers made of the above, an alloy obtained by adding tungsten (W) or manganese (Mn) to the above-mentioned metal material, or a laminate metal layer obtained by combining the above.

A protective insulating film PAS is formed on the data signal line DL and the source electrode SM. The protective insulating film PAS may be made of silicon nitride or silicon dioxide. The protective insulating film PAS may be omitted. On the protective insulating film PAS, an interlayer insulating film ORG (organic protective layer) is formed. The interlayer insulating film ORG is made of a photosensitive organic material containing acrylic as a main component. The organic material has a relative dielectric constant of 4 or less, which is lower than the relative dielectric constant of silicon nitride of 6.7. Further, in terms of production, the organic material can be formed thicker than silicon nitride. In this embodiment, its thickness is set to 1.5 µm to 3 µm. The relative dielectric constant can be set low and the thickness can be set large, and hence a wiring capacitance formed between the transparent common electrode CT arranged on the interlayer insulating film ORG and the data signal line DL or the gate signal line GL can be significantly reduced.

The transparent common electrode CT is made of the transparent electrode material ITO2. As the material, indium tin oxide or indium zinc oxide is used. The transparent common electrode CT extends in the vertical (column) direction for each data signal line DL with the data signal line DL as a boundary, and is separated above the data signal line DL. On the end portion of the transparent common electrode CT, the common electrode metal wiring MSL is formed with use of a low resistance metal material. The common electrode metal wiring MSL reduces the resistance of the transparent common electrode CT, and reduces the wiring delay of the transparent common electrode CT extending in the vertical (column) direction, to thereby achieve satisfactory image quality. When viewing the cross section of the data signal line DL, above the data signal line DL, the transparent common electrodes CT are arranged at an interval, and the transparent common electrode CT does not continuously cover the data signal line DL.

The transparent pixel electrode PIT is electrically connected to the source electrode SM via a contact hole opened through the protective insulating film PAS, the interlayer insulating film ORG, and an interlayer insulating film SNG. The transparent pixel electrode PIT has a closed planar pattern inside a single pixel region defined by the gate signal lines GL and the data signal lines DL arranged in matrix. The data voltage is supplied to the transparent pixel electrode PIT when the gate-on voltage is applied to the gate signal line GL so that the semiconductor layer SEM decreases its resistance and the voltage is transmitted from the data signal line DL via the source electrode SM to the transparent pixel electrode PIT. The data voltage is charged in a capacitor between the transparent pixel electrode PIT and the transparent common electrode CT to which the common voltage is applied.

Above the transparent common electrode CT, the transparent pixel electrode PIT is formed through intermediation of the interlayer insulating film SNG. The interlayer insulating film SNG is made of, similarly to other insulating films, silicon nitride or silicon dioxide.

When the gate-on voltage is applied to the gate signal line GL, the data voltage is transmitted to the transparent pixel electrode PIT via the data signal line DL, the semiconductor layer SEM, and the source electrode SM. With this, the data voltage is charged in the capacitor between the transparent pixel electrode PIT and the transparent common electrode CT having a common potential. When a gate-off voltage is applied to the gate signal line GL, a period thereafter becomes a storage period, and the semiconductor layer SEM increases its resistance. Therefore, the accumulated charges (voltage) are basically stored.

The first transparent electrode material ITO1 is patterned and separated on the interlayer insulating film SNG as the shield transparent electrode SIT separately from the transparent pixel electrode PIT. The shield transparent electrode SIT is arranged so as to overlap the gap between the transparent common electrodes CT separated above the data signal line DL. A shielding effect can be obtained merely by arranging the shield transparent electrode SIT above the data signal line DL. Therefore, there is no need to set the width of the shield transparent electrode SIT larger than the gap between the adjacent transparent common electrodes CT. The shield transparent electrode SIT has an effect of blocking the fluctuated electric field noise from the data signal line DL. With this, the electric field noise is prevented from entering the liquid crystal layer LC, and hence the width of the black matrix BM can be narrowed, and the aperture ratio can be improved.

FIG. 6 is a sectional view taken along the line 6-6' of FIG. 4. FIG. 6 is a sectional view of three pixels having the data signal lines DL as boundaries. The center pixel corresponds to a green color filter CF(G) in the color filter CF arrangement. The left and right pixels correspond to a red color filter CF(R) and a blue color filter CF(B), respectively. At the boundary between the pixels at which the data signal line DL is arranged, the black matrix BM is formed on the inner surface of the first transparent substrate SUB1 across the liquid crystal layer LC.

The data signal line DL and the black matrix BM have an effect of preventing color mixture caused by transmitted light of the backlight unit from the adjacent pixel, which is visible when the pixel defined by the color filter CF is obliquely viewed. Although the light of the backlight unit is not shown, the second transparent substrate SUB2 is irradiated with the light from the outer side of the second polarizing plate POL2 attached to the outer side of the second transparent substrate SUB2. Note that, when the widths of the data signal line DL and the black matrix BM are increased, the aperture ratio and the transmittance reduce, and the display becomes dark, which causes a problem of increase in power consumption. In particular, this problem is the greatest challenge in a high resolution liquid crystal display device, and hence a configuration in which no display failure is caused even when the black matrix BM and the data signal line DL are thinned is demanded.

Note that, in this embodiment, the semiconductor layer SEM is formed below the data signal line DL in relation to the manufacturing method. When amorphous silicon or low temperature polysilicon (LIPS) is used for the semiconductor layer SEM, the semiconductor layer SEM is substantially not transparent. Therefore, the aperture ratio is reduced when the width of the semiconductor layer SEM is too large similarly to the case of the data signal line DL.

The sectional view of FIG. 6 illustrates a pixel boundary region of the non-light-transmissive black matrix BM or data signal line DL, and a light-transmissive aperture region. First, the structure and operation of the aperture region are described below.

In the aperture region, a data voltage and a common voltage are applied to the transparent pixel electrode PIT and the transparent common electrode CT, respectively, and an electric field generated between those electrodes is applied to the liquid crystal layer LC. Depending on the intensity of the electric field, the intensity of elliptically polarized light in the liquid crystal layer LC changes to control the transmittance and display the gray-scale. The liquid crystal display device is set to have the maximum transmittance when the maximum voltage difference is applied. The liquid crystal display device LCD is an in-plane switching (IPS) liquid crystal display device, and hence the transmittance reduces toward black display as the voltage difference between the transparent pixel electrode PIT and the transparent common electrode CT decreases. As the voltage difference increases, the transmittance increases, and white display is achieved at the time of the maximum voltage difference. The maximum transmittance obtained when the maximum voltage is applied is sometimes simply referred to as transmittance.

The liquid crystal molecules LCM as an organic material are filled in the liquid crystal layer LC. The first alignment film AL1 formed on the first transparent substrate SUB1 and the second alignment film AL2 formed on the inner surface of the second transparent substrate SUB2 have surfaces subjected to alignment processing so as to fix the liquid crystal molecules LCM. The transparent pixel electrode PIT includes an electrode portion and a gap (slit portion). Below the slit portion, the transparent common electrode CT is formed through intermediation of the interlayer insulating film SNG. Therefore, an electric line of force is formed by an electric field that folds back toward the liquid crystal layer LC when the voltage between the two electrodes increases. The maximum electric field region is at the boundary between the electrode portion and the slit portion of the transparent pixel electrode PIT, and hence even when the same voltage (electric field) is applied, the rotation of the liquid crystal molecules LCM increases to increase the transmittance. In contrast, when the widths of the electrode portion and the slit portion of the transparent pixel electrode PIT are increased, the electric field in the vicinity of the center of the electrode portion and the slit portion is weakened to reduce the transmittance. Therefore, the dimensions of the electrode portion and the slit portion are required to be set narrow. Therefore, the pixel region has a transmittance distribution in a lateral direction of the sectional view of FIG. 6.

In order to achieve a bright liquid crystal display device with low power consumption, first, it is necessary to reduce the width of the black matrix BM, which is a light shielding region for the data signal line DL at a boundary of the pixels, or the width of the data signal line DL. With this, the aperture ratio can be increased.

In this embodiment, above the data signal line DL, the transparent common electrode CT is divided on the interlayer insulating film ORG for each vertical pixel region in the column direction. This enables inverting, for each column, the polarity of the common voltage to be supplied from the common electrode drive inverting circuit of FIG. 1, thereby achieving low voltage drive. On the other hand, in order to increase the aperture ratio, it is necessary to shield the upper side of the data signal line DL with a fixed potential. When the data signal line DL is not shielded, electric field noise from the data signal line DL enters the liquid crystal layer LC to generate crosstalks. In FIG. 5, a film made of the first transparent electrode material ITO1, which is formed in the same step as the transparent pixel electrode PIT, is patterned and separated, to thereby arrange the shield transparent electrode SIT between the adjacent transparent common electrodes CT above the data signal line DL through intermediation of the interlayer insulating film SNG. The voltage of the shield transparent electrode SIT is set as a floating potential that is close to the center value of the amplitude of the common voltage to be applied to the adjacent transparent common electrodes CT. The shield transparent electrode SIT is arranged in a connected mesh state in the entire pixel region, and hence the floating potential stably becomes the center value of the amplitude of the common voltage. Therefore, the floating potential is substantially a fixed potential.

On the other hand, the transparent common electrode CT extends while covering the plurality of gate signal lines GL in each column, and hence wiring delay is required to be reduced. Therefore, the common electrode metal wiring MSL made of a low resistance metal material is formed on the end portion of the transparent common electrode CT in a single pixel region so as to be connected thereto.

The shield transparent electrode SIT has a fixed potential that is different from the voltages of the adjacent transparent common electrodes CT. Therefore, the liquid crystal molecules LCM may be rotated to cause transmission by an electric field generated from the shield transparent electrode SIT via the liquid crystal layer LC to reach the transparent common electrode CT. This leads to reduction in contrast ratio. In view of this point, in this embodiment, the common electrode metal wiring MSL is formed on the end portion of the transparent common electrode CT. Therefore, a part that causes contrast reduction is shielded, and thus reduction in contrast ratio can be prevented. Therefore, the shielding of the electric field from the data signal line DL can be suppressed, and hence a bright liquid crystal display device with low power consumption can be achieved.

FIG. 7 is a sectional view taken along the line 7-7' of FIG. 4. As illustrated in FIG. 7, at a center of pixels that are vertically (column direction) adjacent to each other, the shield transparent electrode SIT is arranged in parallel to the gate signal line GL above the gate signal line GL. The liquid crystal layer LC is driven by an electric field generated from the transparent pixel electrode PIT via the liquid crystal layer LC and the interlayer insulating film SNG to reach the transparent common electrode CT.

The upper side of the gate signal line GL is completely covered with the transparent common electrode CT, and hence electric field noise from the gate signal line GL does not enter the liquid crystal layer LC. On the other hand, as illustrated in FIG. 6, the shield transparent electrode SIT for shielding, above the data signal line DL, the gap between the adjacent transparent common electrodes CT extends in the column direction, and is connected in the lateral direction (row direction) to the shield transparent electrode SIT arranged above the gate signal line GL illustrated in FIG. 7. With this, the shield transparent electrode SIT is formed into a mesh planar pattern in the entire screen display region DIA. This laterally connected shield transparent electrode SIT overlaps the transparent common electrode CT through intermediation of the interlayer insulating film SNG to form a large capacitive coupling. The transparent common electrode CT extending in the column direction, which is provided for each column, has a voltage oscillating on positive and negative sides. Further, the shield transparent electrode SIT is arranged in a mesh state inside the screen display region DIA. Therefore, the shield transparent electrode SIT has a substantially constant potential that does not fluctuate from the center voltage of the amplitude. Therefore, the floating state can be obtained without connection to a power supply.

FIGS. 8A to 13B illustrate a manufacturing process of the thin film transistor TFT, the wiring region, and the aperture portion, which are formed on the second transparent substrate SUB2 in this embodiment. The respective figures illustrate the manufacturing process in plan view of a single pixel and in sectional view taken along the line b-b' of the plan view. The respective figures illustrate each photo-etching step in the above-mentioned TFT manufacturing process.

FIG. 8A is a plan view of a single pixel at a time point when a first photo-etching step for the thin film transistor TFT is finished, and FIG. 8B is a sectional view taken along the line b-b' of FIG. 8A. The adjacent gate signal lines GL are formed on the second substrate SUB2 by sputtering, and are patterned in the first photo-etching step. The gate signal line GL has a thickness of 100 nm to 300 nm, and is a laminate film of copper (Cu) and molybdenum (Mo) formed thereon. As the wiring material, other than copper (Cu), a laminate film of molybdenum (Mo) and aluminum (Al), a laminate film of titanium (Ti) and aluminum (Al), or MoW as an alloy of molybdenum (Mo) and tungsten (W) may be used.

Figure 9A:
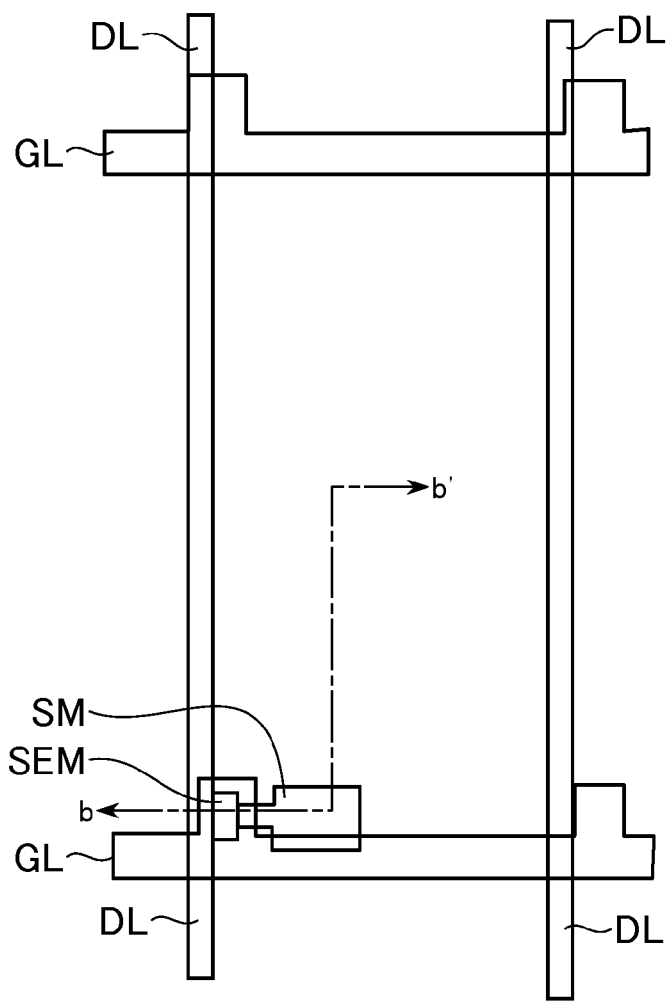
FIG. 9A is a plan view illustrating a second step in the TFT manufacturing process in the liquid crystal display panel illustrated in FIG. 4.
Figure 9B:
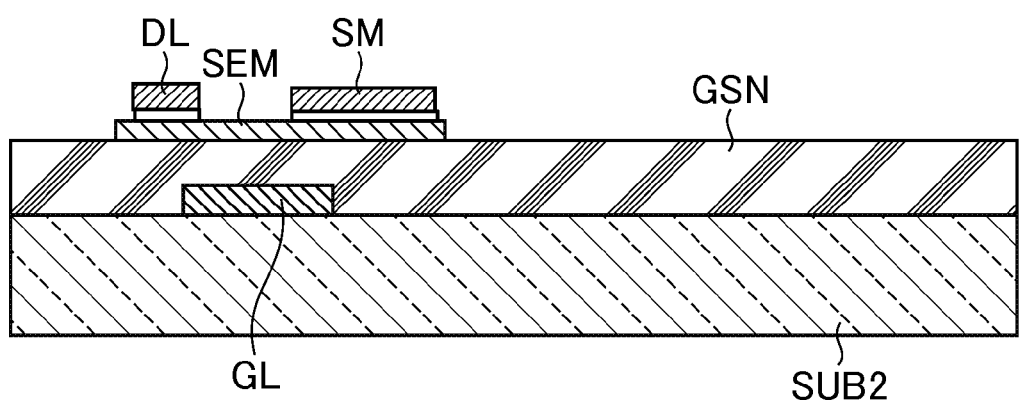
FIG. 9B is a sectional view taken along the line b-b' of the liquid crystal display panel illustrated in FIG. 9A.

FIG. 9A is a plan view of a single pixel at a time point when a second photo-etching step for the thin film transistor TFT is finished, and FIG. 9B is a sectional view taken along the line b-b' of FIG. 9A. On the gate signal line GL, the gate insulating film GSN of silicon nitride and the semiconductor layer SEM of amorphous silicon are laminated by CVD. Further thereon, a laminate film of molybdenum (Mo) and copper (Cu) is formed by sputtering. As the material of the metal wiring, similarly to the material of the gate signal line GL, a laminate film of molybdenum (Mo) and aluminum (Al), a laminate film of titanium (Ti) and aluminum (Al), or an alloy of MoW may be used.

The gate insulating film GSN, the semiconductor layer SEM, and the data signal line DL and source electrode SM have thicknesses of about 400 nm, 200 nm, and 300 nm, respectively. A photoresist is formed on the above-mentioned films formed by CVD and sputtering, and exposure is carried out thereto with use of a half-tone photomask. In this manner, regions of the data signal line DL, the source electrode SM, and the semiconductor layer SEM can be formed.

Figure 10A:
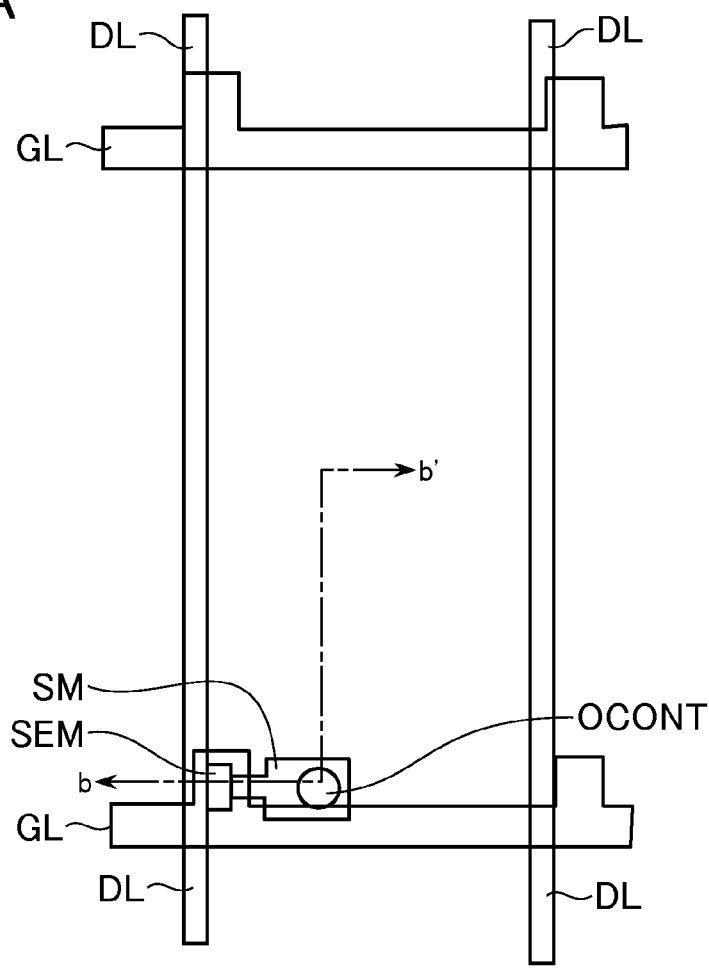
FIG. 10A is a plan view illustrating a third step in the TFT manufacturing process in the liquid crystal display panel illustrated in FIG. 4.
Figure 10B:
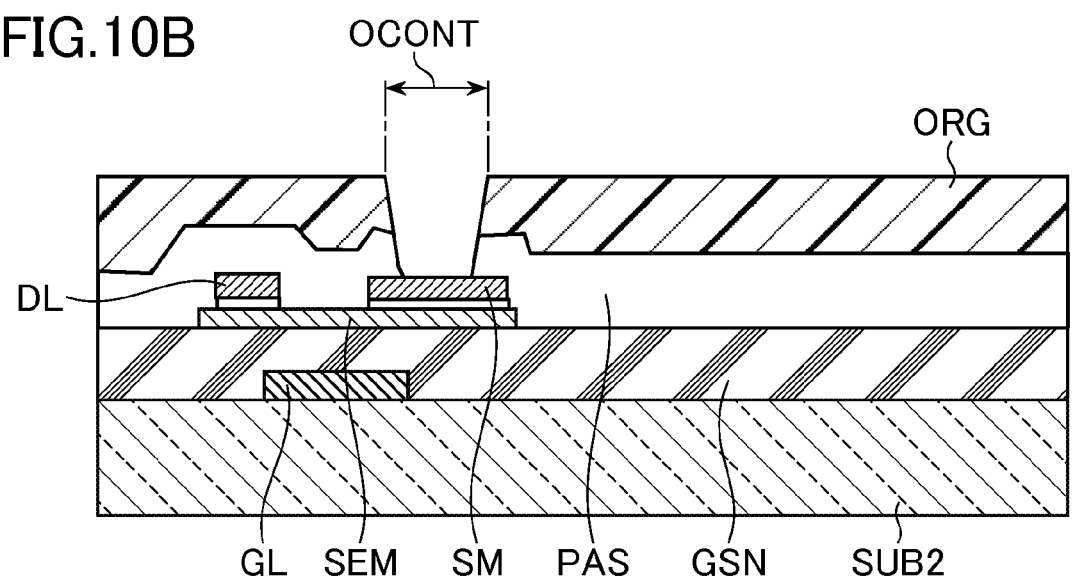
FIG. 10B is a sectional view taken along the line b-b' of the liquid crystal display panel illustrated in FIG. 10A.

FIG. 10A is a plan view of a single pixel at a time point when a third photo-etching step for the thin film transistor TFT is finished, and FIG. 10B is a sectional view taken along the line b-b' of FIG. 10A. On the data signal line DL and the source electrode SM, the protective insulating film PAS is formed by CVD, and the interlayer insulating film ORG of photosensitive acrylic is applied thereon. The protective insulating film PAS is made of silicon nitride and has a thickness of 200 nm to 400 nm. A photosensitive acrylic material itself may be used as a resist in the photo-etching step, and hence with use a photomask, an opening portion is formed through this material above the source electrode SM by developing processing. With use of the interlayer insulating film ORG itself as a photomask, the protective insulating film PAS is subjected to dry etching to form a contact hole OCONT that passes through the protective insulating film PAS to reach the surface of the source electrode SM.

Figure 11A:
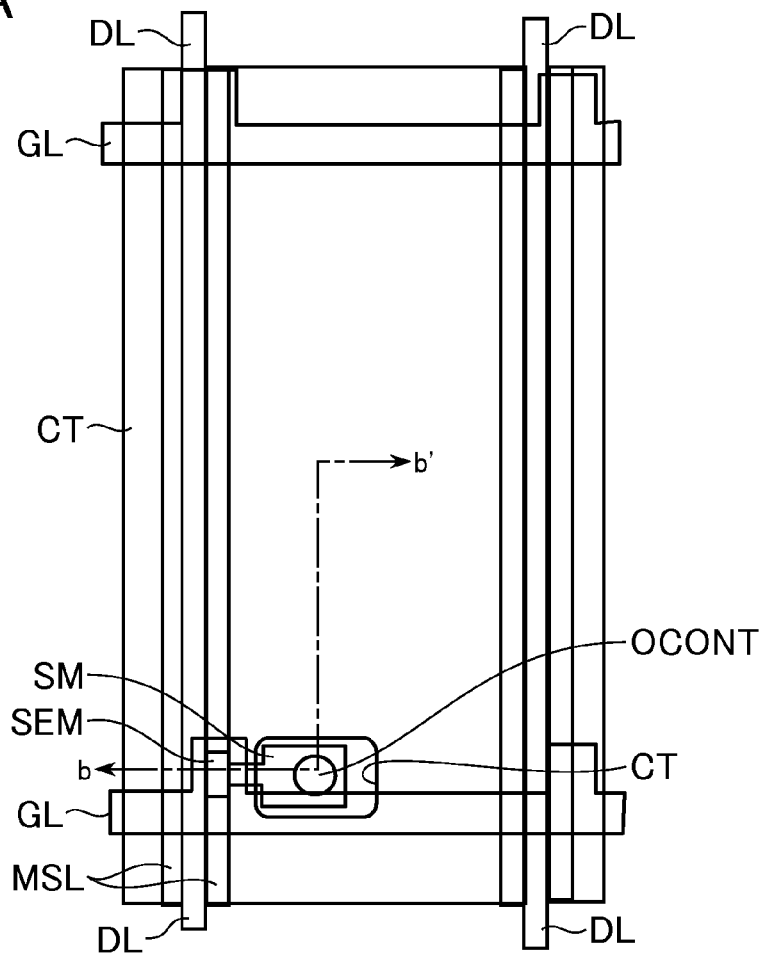
FIG. 11A is a plan view illustrating a fourth step in the TFT manufacturing process in the liquid crystal display panel illustrated in FIG. 4.
Figure 11B:
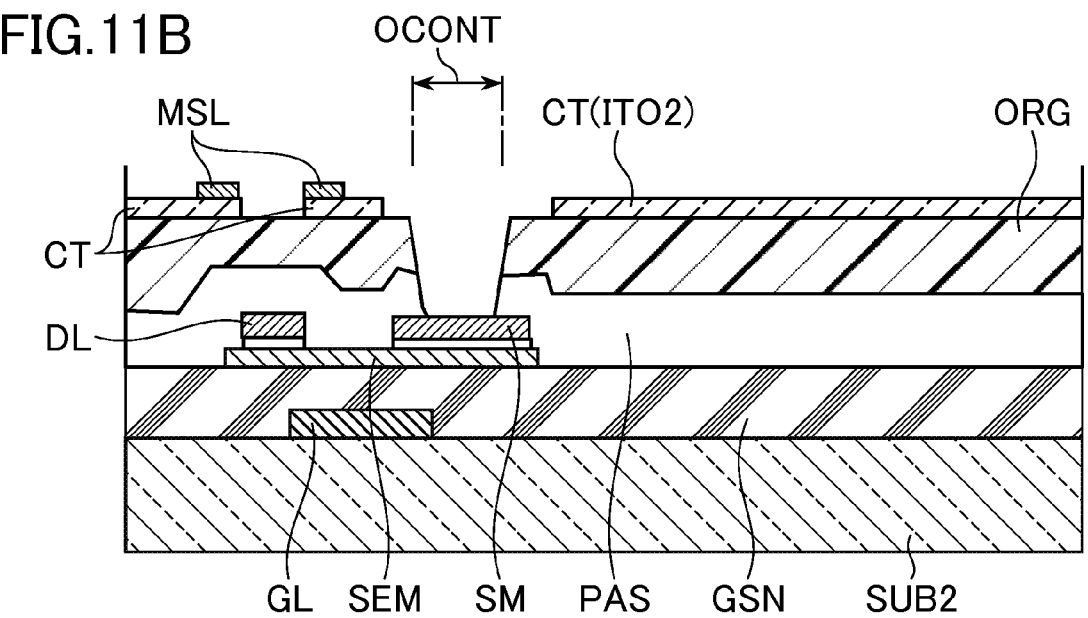
FIG. 11B is a sectional view taken along the line b-b' of the liquid crystal display panel illustrated in FIG. 11A.

FIG. 11A is a plan view of a single pixel at a time point when a fourth photo-etching step for the thin film transistor TFT is finished, and FIG. 11B is a sectional view taken along the line b-b' of FIG. 11A. A film of the second transparent electrode material ITO2, which corresponds to indium tin oxide that is a transparent electrode material, is formed, and subsequently a film made of a metal material, such as a laminate film of molybdenum or titanium and aluminum and a laminate film of copper and molybdenum, is formed. A photoresist is applied thereon, and then half-tone exposure is carried out. In this manner, the common electrode metal wiring MSL and the transparent common electrode CT can be formed.

Figure 12A:
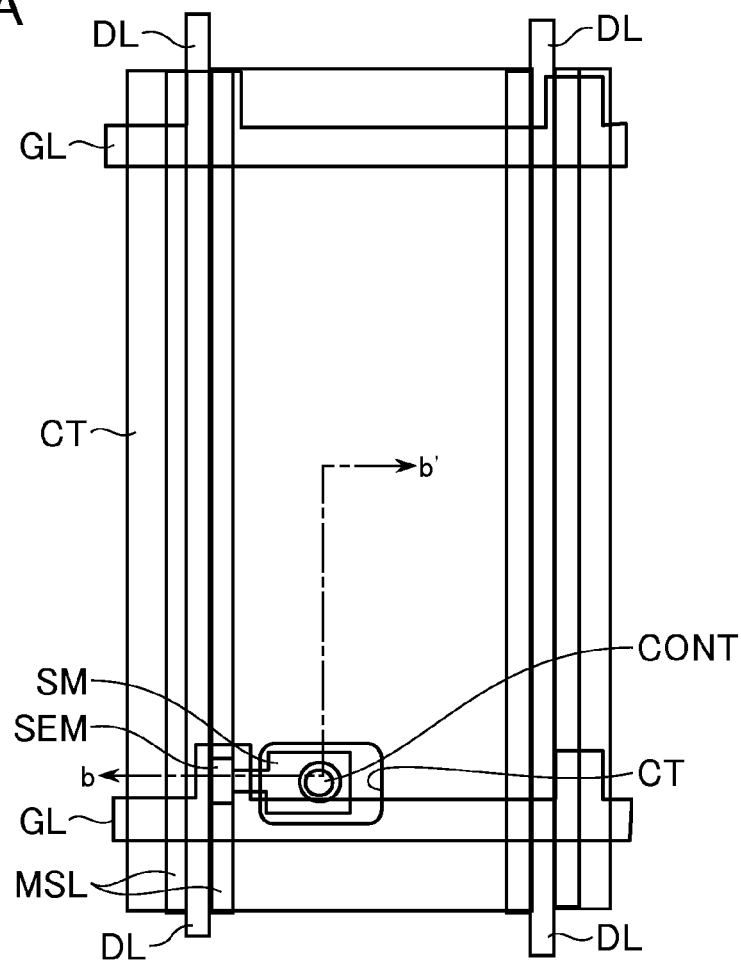
FIG. 12A is a plan view illustrating a fifth step in the TFT manufacturing process in the liquid crystal display panel illustrated in FIG. 4.
Figure 12B:
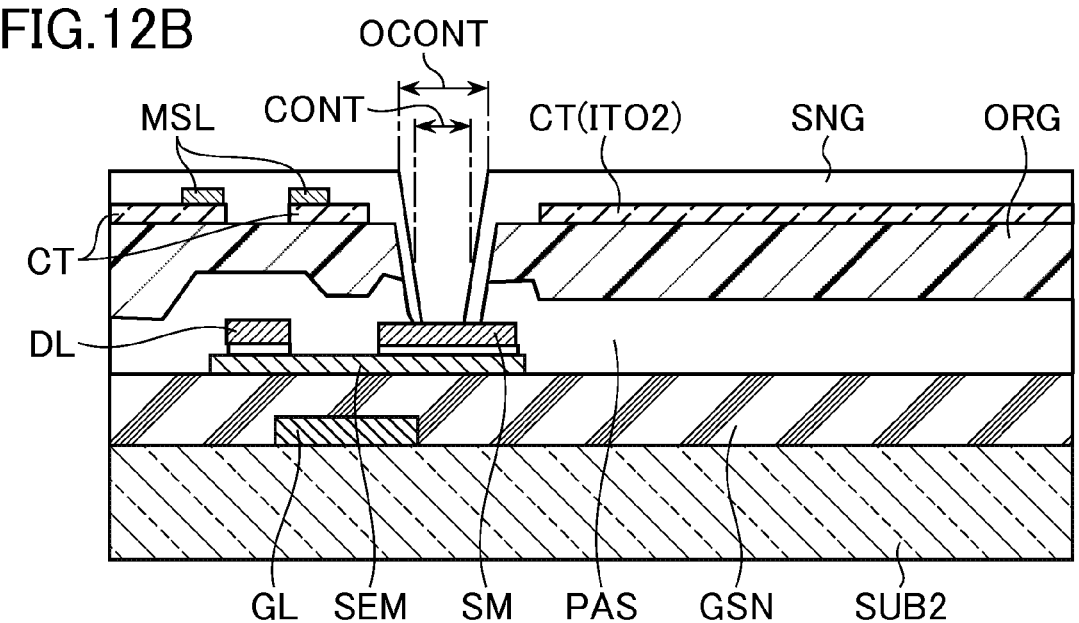
FIG. 12B is a sectional view taken along the line b-b' of the liquid crystal display panel illustrated in FIG. 12A.

FIG. 12A is a plan view of a single pixel at a time point when a fifth photo-etching step for the thin film transistor TFT is finished, and FIG. 12B is a sectional view taken along the line b-b' of FIG. 12A. On the transparent common electrode CT, the interlayer insulating film SNG is formed by CVD. The interlayer insulating film SNG is made of silicon nitride and has a thickness set to 200 nm and 600 nm. In this manner, the contact hole CONT for taking out the transparent pixel electrode PIT is formed.

Figure 13A:
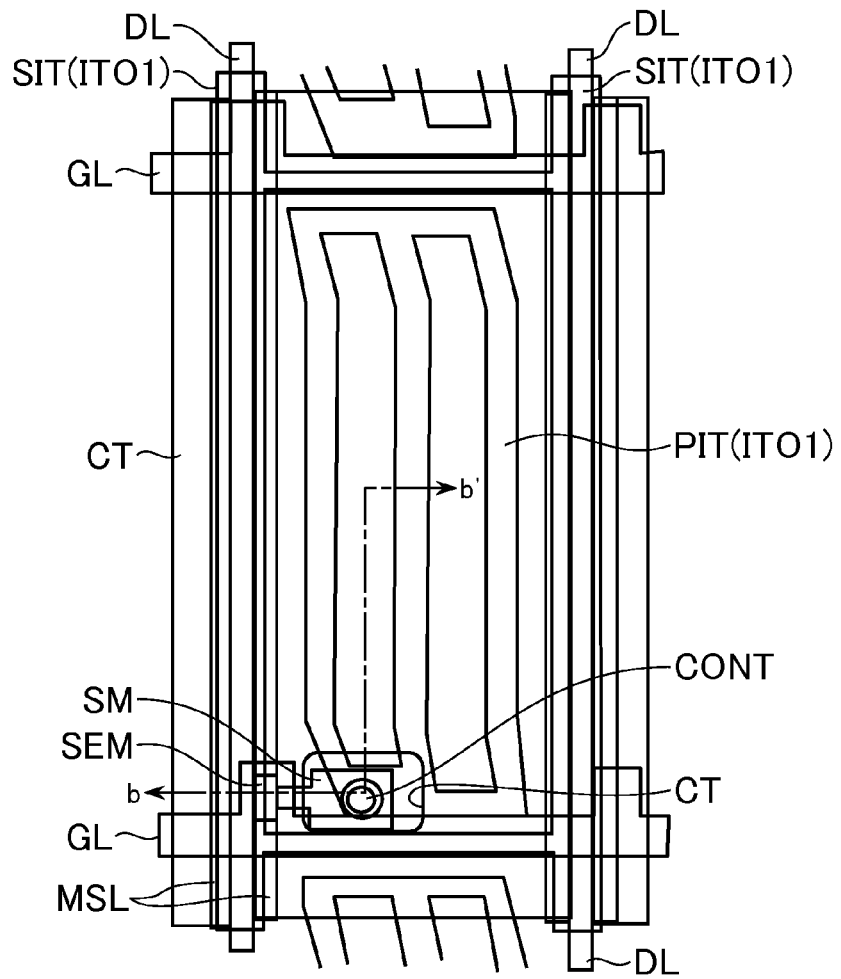
FIG. 13A is a plan view illustrating a sixth step in the TFT manufacturing process in the liquid crystal display panel illustrated in FIG. 4.
Figure 13B:
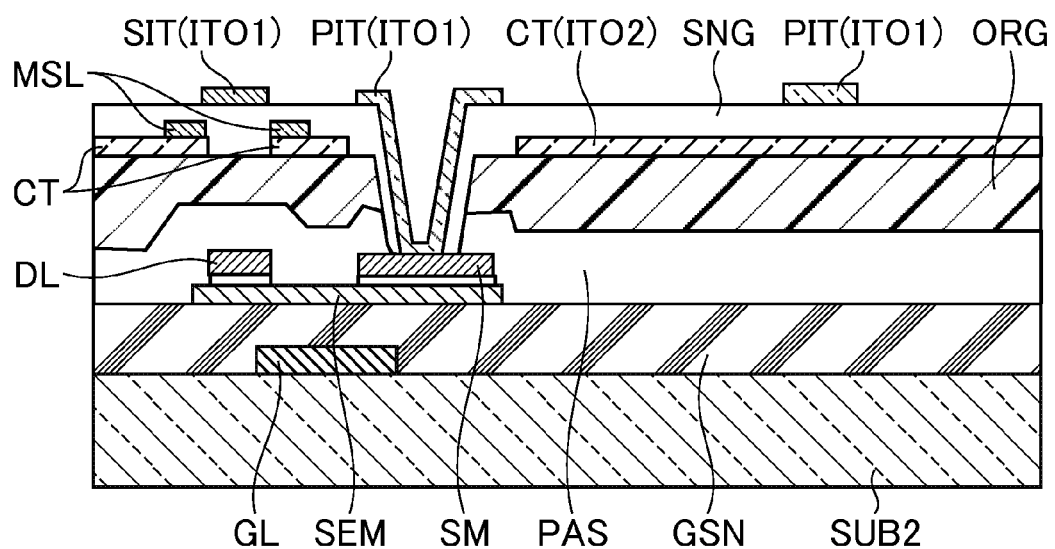
FIG. 13B is a sectional view taken along the line b-b' of the liquid crystal display panel illustrated in FIG. 13A.

FIG. 13A is a plan view of a single pixel at a time point when a sixth photo-etching step for the thin film transistor TFT is finished, and FIG. 13B is a sectional view taken along the line b-b' of FIG. 13A. On the interlayer insulating film SNG, a film made of the first transparent electrode material ITO1, which corresponds to indium tin oxide that is a material for the transparent pixel electrode PIT and the shield transparent electrode SIT, is formed, and this film is subjected to photo-etching to process the transparent pixel electrode PIT and the shield transparent electrode SIT. The transparent pixel electrode PIT is processed to have a pattern with a single slit, and is connected to the source electrode SM. The shield transparent electrode SIT is processed into a mesh pattern, which covers the data signal line DL and the gate signal line GL, and is integrated inside the screen display region DIA.

As described above, with the six photo-etching steps, the thin film transistor TFT can be manufactured on the second transparent substrate SUB2.

Second Embodiment

Figure 14:
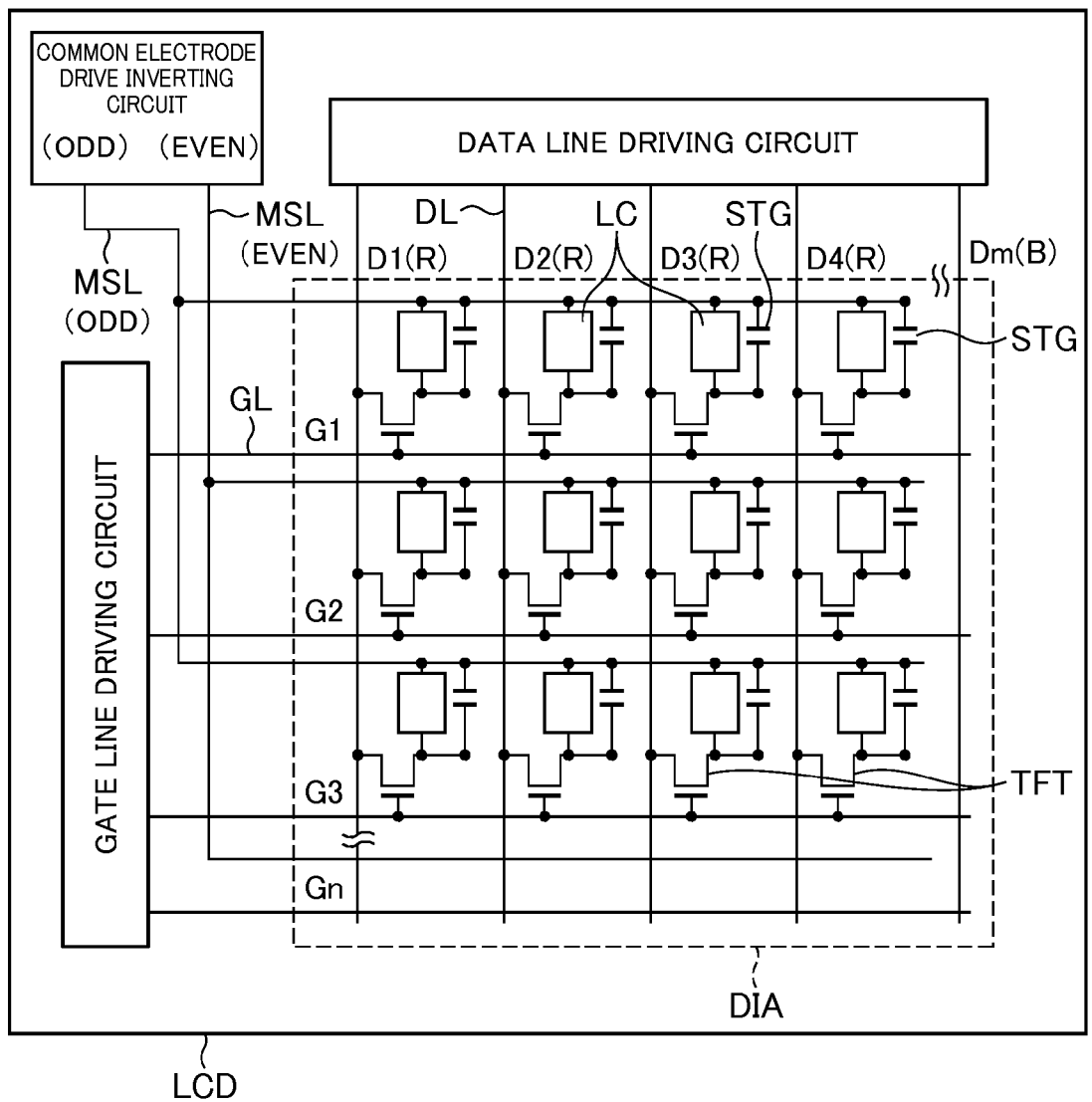
FIG. 14 is a diagram illustrating the entire configuration of a liquid crystal display device according to a second embodiment of the present application.

FIG. 14 is a diagram illustrating the entire configuration of a liquid crystal display device according to a second embodiment of the present application. A liquid crystal display device LCD includes a screen display region DIA and a driving circuit region for driving the screen display region DIA. The screen display region DIA includes a plurality of pixel regions arranged in matrix in a row direction and a column direction. The pixel regions perform active matrix display. Specifically, a gate voltage is supplied from a gate line driving circuit to gate signal lines G1, G2, and Gn, and a video data voltage is supplied from a data line driving circuit to data signal lines D1, D2, and Dm. The gate voltage turns on or off a thin film transistor TFT to supply the data voltage to a pixel electrode. An electric field generated between the data voltage supplied to the pixel electrode and a common voltage supplied from a common electrode drive inverting circuit drives a liquid crystal layer LC. In this manner, transmittance of light is controlled to display an image. In order to prevent voltage reduction in the liquid crystal layer LC, a storage capacitor STG is formed in each pixel region. The common voltage is supplied via common electrode metal wiring MSL connected to the common electrode drive inverting circuit to a transparent common electrode CT provided in the screen display region DIA.

In the active matrix arrangement in the screen display region DIA of the liquid crystal display device LCD according to this embodiment, the common electrode metal wiring MSL is collected for each of the odd row and the even row in a lateral direction (row direction) to be connected to the common electrode drive inverting circuit. Therefore, the common electrode drive inverting circuit has a configuration capable of simultaneously supplying common voltages having different polarities from each other to the odd row and the even row, that is, a common voltage having a positive polarity with respect to a center voltage and a common voltage having a negative polarity with respect to the center voltage.

Color display may be achieved by applying a desired data voltage to each of the data signal lines D1(R), D2(G), and D3(B) connected to pixels of red (R), green (G), and blue (B), which are formed of vertical-stripe color filters. Row inversion drive is applied so that the data voltage having the same negative or positive polarity with respect to the center value of the amplitude value of the common voltage is applied in the row direction. Therefore, the transparent common electrode CT extends for each row in the lateral direction (row direction) with the gate signal line GL as a boundary.

Figure 15:
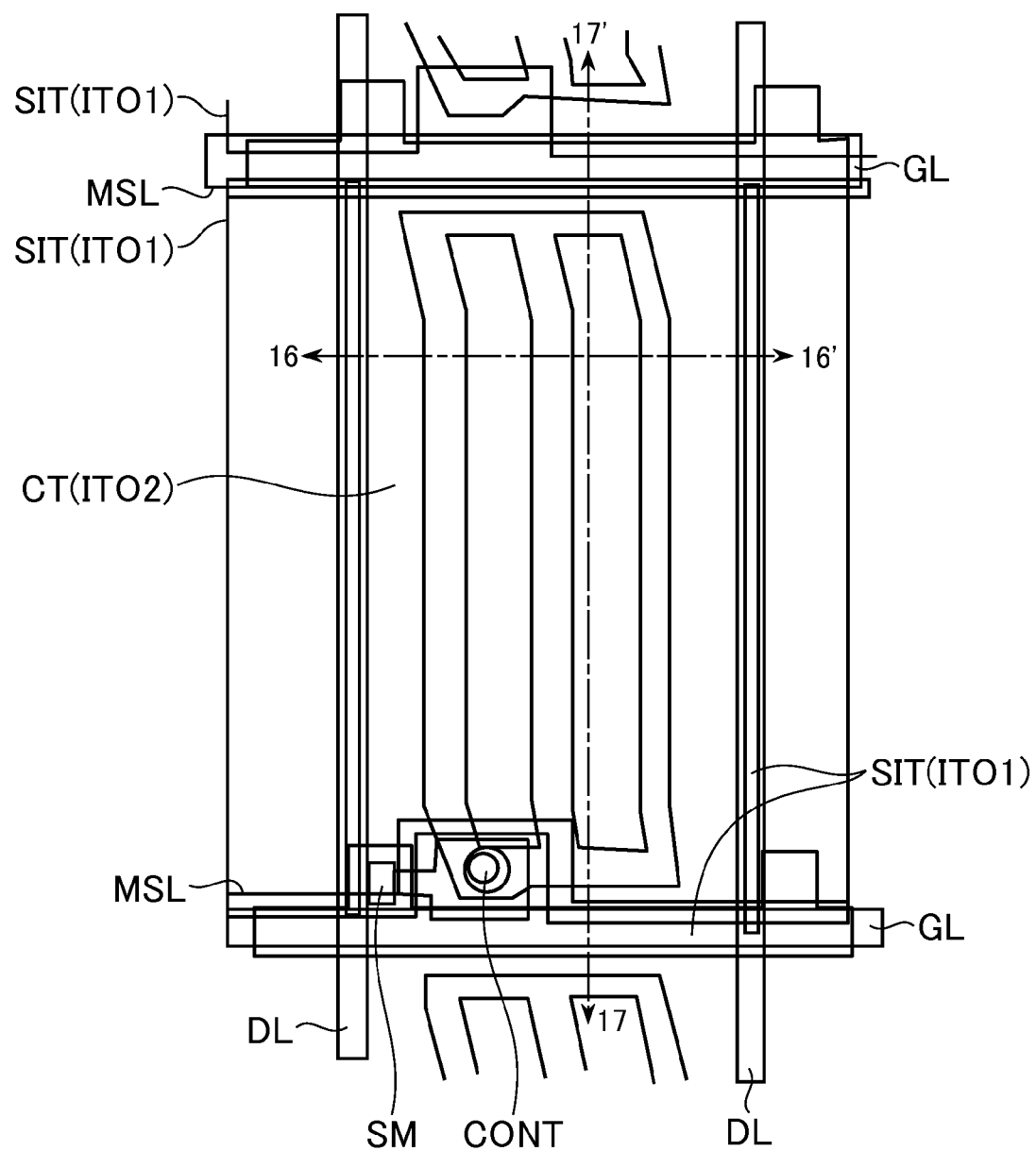
FIG. 15 is a plan view of a single pixel of a liquid crystal display panel in the liquid crystal display device illustrated in FIG. 14.
Figure 16:
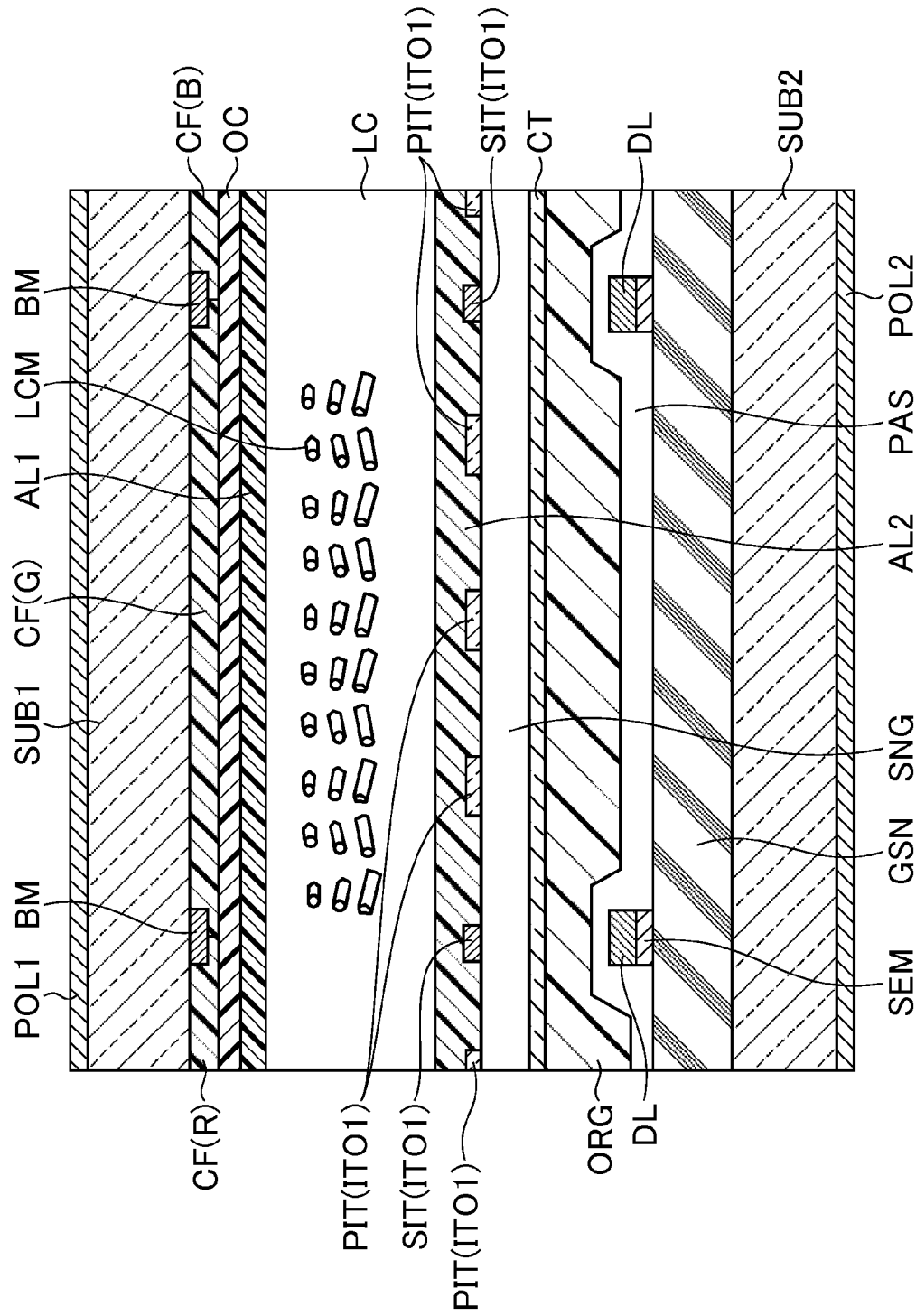
FIG. 16 is a sectional view taken along the line 16-16' of the liquid crystal display panel illustrated in FIG. 15.
Figure 17:
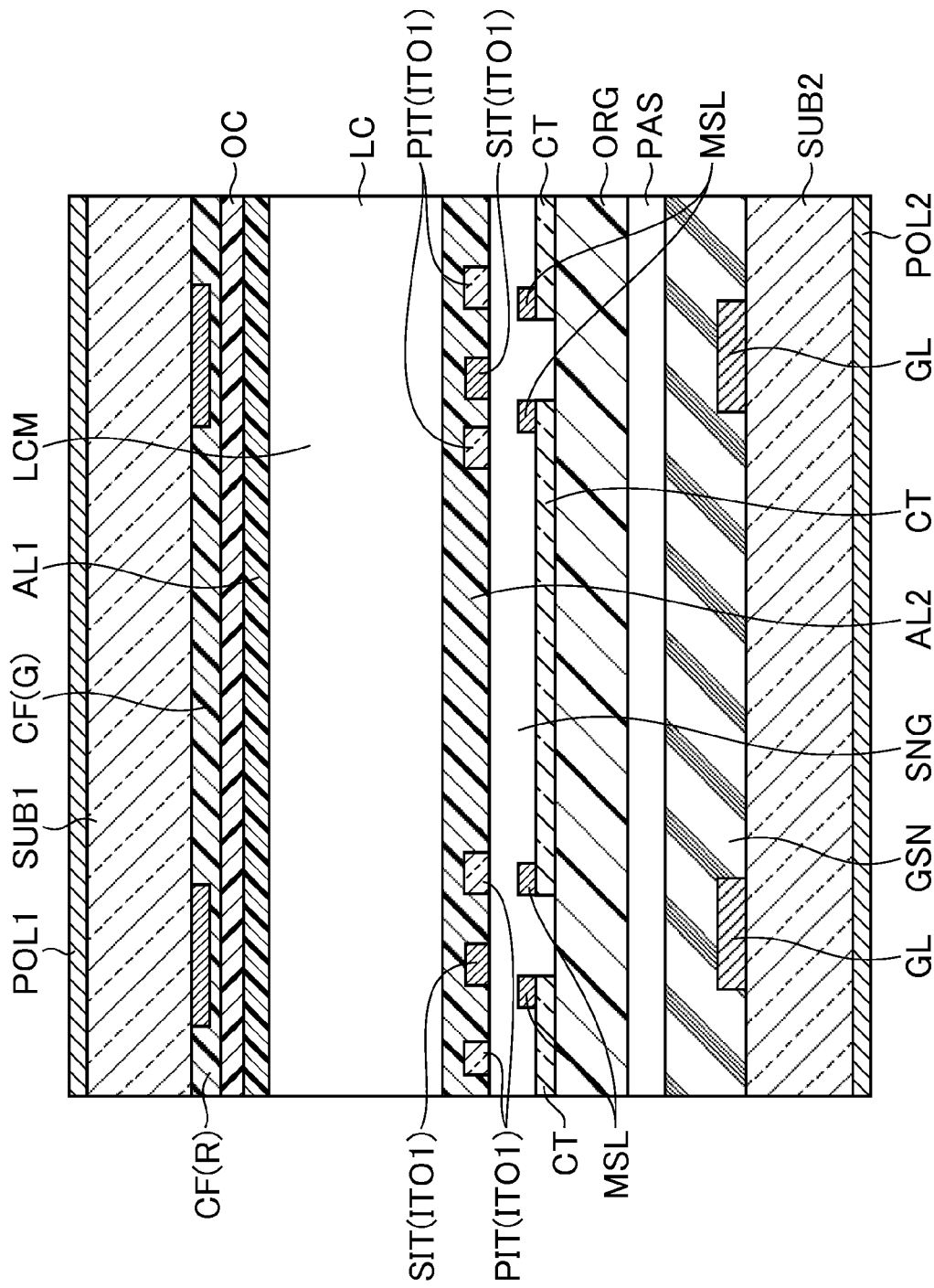
FIG. 17 is a sectional view taken along the line 17-17' of the liquid crystal display panel illustrated in FIG. 15.

FIG. 15 is a detailed plan view of a single pixel, FIG. 16 is a sectional view taken along the line 15-15' of FIG. 15, and FIG. 17 is a sectional view taken along the line 17-17' of FIG. 15.

FIG. 15 is a plan view of a region which includes a single pixel surrounded by the thin film transistor TFT, the gate signal lines GL, and the data signal lines DL and adjacent surrounding pixels. The planar arrangement of the pixels and the function thereof are described below. The gate signal line GL is formed of a low resistance metal layer, and is connected to the gate line driving circuit of FIG. 14 to be supplied with the gate voltage. On the other hand, the data signal line DL is also formed of a low resistance metal layer, and is connected to the data line driving circuit of FIG. 14 to be supplied with the video data voltage. When the gate-on voltage is supplied to the gate signal line GL, a semiconductor layer SEM of the thin film transistor TFT decreases its resistance. The voltage of the data signal line DL is transmitted to a source electrode SM formed of a low resistance metal layer, and then is transmitted to a transparent pixel electrode PIT (ITO1) connected to the source electrode SM via a contact hole CONT. In this case, the transparent electrode is used not only as the pixel electrode PIT but also for connection to the outside of the liquid crystal display panel. Therefore, the material of the transparent electrode is referred to as ITO1.

As for the common voltage that is the other voltage to be applied to the liquid crystal layer LC, a voltage having an odd-side polarity is applied from the common electrode drive inverting circuit of FIG. 14 to the transparent common electrode CT (ITO2) of the pixel in the odd row, and a voltage having an even-side polarity is applied from the common electrode drive inverting circuit of FIG. 14 to the transparent common electrode CT (ITO2) of the pixel in the even row. The transparent common electrode CT is made of a second transparent electrode material ITO2. The transparent pixel electrode PIT is laminated on the transparent common electrode CT through intermediation of an insulating film. Further, the transparent pixel electrode PIT has a slit formed in the display region of a single pixel. Through this slit, an electric field of the transparent pixel electrode PIT is applied from above to the liquid crystal layer for liquid crystal drive. This electric field reaches the transparent common electrode CT to perform display.

The transparent common electrode CT is divided for each gate signal line GL in the lateral direction (row direction), and extends in the row direction across the data signal line DL. Therefore, the transparent common electrode CT does not cover the gate signal line GL from above. That is, in plan view, a gap between the adjacent transparent common electrodes CT overlaps the gate signal line GL. When the gate signal line GL is not covered with and shielded by a fixed voltage, the change of voltage sequentially sent from the gate signal line GL enters the liquid crystal layer LC as electric field noise to cause malfunction. In order to prevent this malfunction, the width of the black matrix BM formed on the first transparent substrate SUB1 and above the gate signal line GL needs to be increased. As a result, the aperture ratio is markedly decreased.

In view of this point, in the liquid crystal display device LCD according to this embodiment, a shield transparent electrode SIT formed by patterning and separating a film made of the first transparent electrode material ITO1, which is formed in the same step as the transparent pixel electrode PIT, is arranged above the gate signal line GL. In this manner, a shielding effect can be improved, and a high aperture ratio can be maintained because it is unnecessary to increase the width of the black matrix BM.

The shield transparent electrode SIT is set in a state in which a center voltage of a voltage whose polarity is invertible is applied to each of the odd row and the even row or a floating state in which no voltage is applied thereto. The shield transparent electrode SIT is arranged so as to cover the gate signal line GL and formed into a mesh shape (grid shape) in the entire screen display region DIA. With this, a large capacitive coupling is formed between the shield transparent electrode SIT and the transparent common electrodes CT of the odd row and the even row even when a voltage is not supplied to the shield transparent electrode SIT. Therefore, a constant value close to the amplitude center of the common voltage can be stably obtained, and the shielding effect can be maintained.

FIG. 16 is a sectional view taken along the line 16-16' of FIG. 15. FIG. 16 is a sectional view of three pixels having the data signal lines DL as boundaries. The center pixel corresponds to a green color filter CF(G) in the color filter CF arrangement. The left and right pixels correspond to a red color filter CF(R) and a blue color filter CF(B), respectively. At the boundary between the pixels at which the data signal line DL is arranged, the black matrix BM is formed on the inner surface of the first transparent substrate SUB1 across the liquid crystal layer LC.

The sectional view of FIG. 16 illustrates a pixel boundary region of the non-light-transmissive black matrix BM or data signal line DL, and a light-transmissive aperture region. In order to achieve a bright liquid crystal display device with low power consumption, first, it is necessary to reduce the width of the black matrix BM, which is a light shielding region for the data signal line DL at a boundary of the pixels, or the width of the data signal line DL. With this, the aperture ratio can be increased.

In this embodiment, unlike the first embodiment (see FIG. 6), above the data signal line DL, the transparent common electrode CT is not divided on the interlayer insulating film ORG for each vertical pixel region in the column direction. The data signal line DL is completely shielded by the transparent common electrode CT, and electric field noise does not enter the liquid crystal layer LC from the data signal line DL.

Note that, the transparent common electrode CT extends in the lateral direction (row direction), and is divided for each gate signal line GL. This division region has a width of the shield transparent electrode SIT formed thereabove. Further, the shield transparent electrode SIT is formed above the data signal line DL. The shield transparent electrode SIT has a potential different from that of the transparent common electrode CT. Therefore, the liquid crystal molecules LCM may be rotated by an electric field generated from the shield transparent electrode SIT via the liquid crystal layer LC and the interlayer insulating film SNG to reach the transparent common electrode CT. As a result, light may leak from the vicinity of the light shield transparent electrode SIT to cause reduction in contrast ratio. Therefore, the shield transparent electrode SIT above the data signal line DL is set to have a width narrower that the width of the data signal line DL or the black matrix BM having light shielding characteristics.

FIG. 17 is a sectional view taken along the line 17-17' of FIG. 15. As illustrated in FIG. 17, at the center of pixels that are vertically (column direction) adjacent to each other, the transparent common electrode CT extends in the row direction, and is divided above the gate signal line GL with the gate signal line GL as a boundary. The common electrode metal wiring MSL is arranged on the end portion of the divided transparent common electrode CT, and the shield transparent electrode SIT is arranged for each row on the interlayer insulating film SNG above a gap between adjacent transparent common electrodes CT.

[Driving Method]

Figure 18:
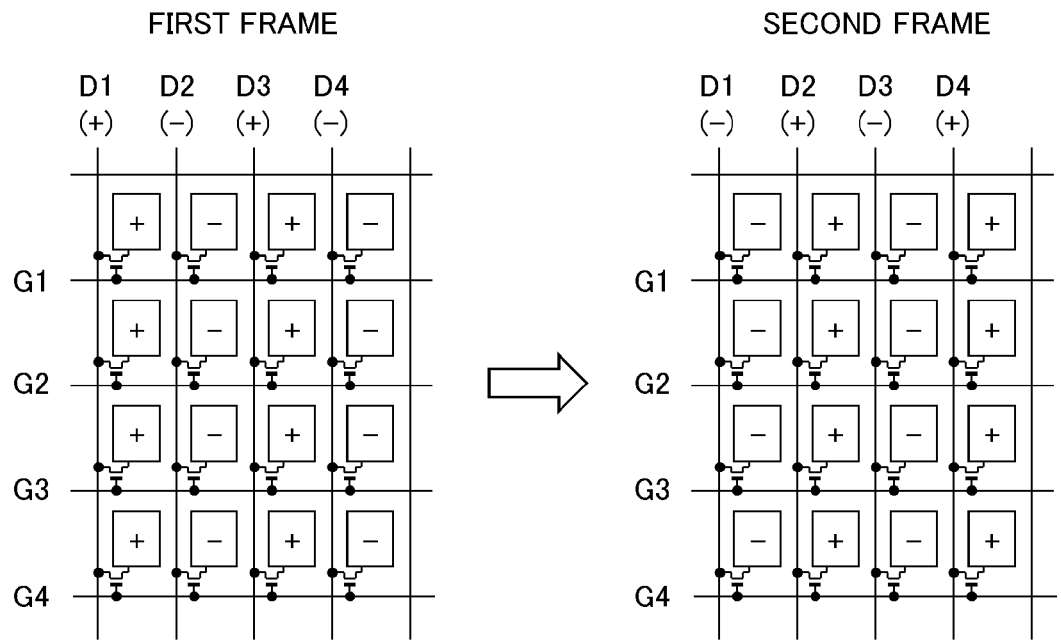
FIG. 18 is a diagram illustrating polarity change of a pixel voltage in column line inversion drive.
Figure 19:
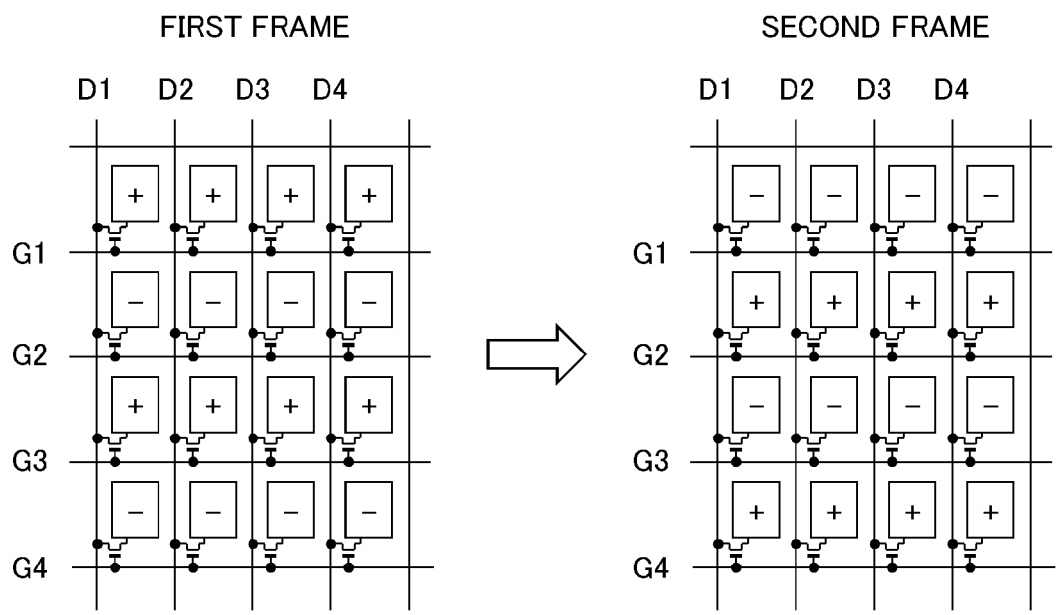
FIG. 19 is a diagram illustrating polarity change of a pixel voltage in row line inversion drive.

The driving method of this liquid crystal display device LCD may be, as represented in the first embodiment, column line inversion drive of inverting the polarities of each pixel voltage for each pixel column, or, as represented in the second embodiment, row line inversion drive of inverting the polarities of each pixel voltage for each pixel row. Note that, in those column line inversion drive and row line inversion drive, the polarities of each pixel voltage may be further inverted for every one or a plurality of frames. FIGS. 18 and 19 illustrate an example of polarity change of the pixel voltage in the continuous first and second frames. FIG. 18 illustrates the column line inversion drive, and FIG. 19 illustrates the row line inversion drive. In each of the figures, the pixel polarity states of the first frame and the second frame are alternately repeated. Note that, in each of the figures, the pixel polarities are inverted for every one frame, but the pixel polarities may be inverted for every plurality of frames.

According to the respective embodiments described above, a lower data voltage may be used for drive, the cost of the data line driving circuit may be reduced, the circuit power may be reduced, and further the aperture ratio may be improved due to the shielding structure between the transparent common electrodes CT. In this manner, a bright liquid crystal display device LCD with low power consumption can be achieved.

Further, according to the liquid crystal display device LCD of each embodiment, different voltages (first common voltage and second common voltage) may be supplied to a first common electrode (odd column or odd row) and a second common electrode (even column or even row). Therefore, a voltage (data voltage) to be supplied to the pixel electrode in order to obtain a desired pixel voltage to be applied to liquid crystal can be set low. With this, the data line driving circuit can be driven at a low voltage, and hence the power consumption of the liquid crystal display device can be reduced.

While there have been described what are at present considered to be certain embodiments of the application, it will be understood that various modifications may be made thereto, and it is intended that the appended claims cover all such modifications as fall within the true spirit and scope of the invention.

What is claimed is:

1. A liquid crystal display device, comprising a first substrate on a display surface side and a second substrate on a rear surface side, which are arranged so as to be opposed to each other via liquid crystal, the second substrate comprising a plurality of data signal lines, a plurality of gate signal lines, a plurality of pixels arrayed in a row direction and a column direction, a plurality of pixel electrodes formed individually so as to correspond to the plurality of pixels, respectively, a plurality of common electrodes, formed in a layer that is between a layer in which the liquid crystal is present and respective layers in which the data signal lines and the gate signal lines are present, that extend in one of the column direction and the row direction and are arranged so as to be opposed to the plurality of pixel electrodes, and a plurality of shield electrodes, each of the shield electrodes overlapping, through intermediation of an insulating film, at least one of a respective one of the plurality of data signal lines and a respective one of the plurality of gate signal lines, the shield electrodes being formed in a layer between the layer in which the common electrodes are present and the layer in which the liquid crystal is present, the plurality of common electrodes comprising a first common electrode to which a first voltage is supplied and a second common electrode to which a second voltage different from the first voltage is supplied, the first common electrode and the second common electrode being alternately arranged in one of the row direction and the column direction, wherein, in plan view, each of the plurality of shield electrodes is formed to overlap at least a gap formed between a respective pair of the first common electrode and the second common electrode that are adjacent to each other in the same layer without an intervening electrode between the first and second common electrodes of the pair, when the plurality of shield electrodes overlap the plurality of data signal lines, the plurality of the shield electrodes are disposed between the liquid crystal and the plurality of data signal lines in plan view, when the plurality of shield electrodes overlap the plurality of gate signal lines, the plurality of the shield electrodes are disposed between the liquid crystal and the plurality of gate signal lines in plan view, and wherein the second substrate comprises the plurality of gate signal lines, a gate insulating film, the plurality of data signal lines, an organic insulating film, an interlayer insulating film, the plurality of common electrodes, an interlayer insulating film, and the plurality of pixel electrodes and the plurality of shield electrodes formed in the same layer, which are laminated in the stated order from a glass substrate side.

2. The liquid crystal display device according to claim 1, wherein each of the plurality of common electrodes extends in the column direction in which the plurality of data signal lines extend, and is formed for each pixel column, and wherein the first common electrode is formed in an odd column, and the second common electrode is formed in an even column.

3. The liquid crystal display device according to claim 2, wherein, in plan view, the gap formed between the first common electrode and the second common electrode that are adjacent to each other overlaps corresponding one of the plurality of data signal lines.

4. The liquid crystal display device according to claim 1, wherein each of the plurality of common electrodes extends in the row direction in which the plurality of gate signal lines extend, and is formed for each pixel row, and wherein the first common electrode is formed in an odd row, and the second common electrode is formed in an even row.

5. The liquid crystal display device according to claim 4, wherein, in plan view, the gap formed between the first common electrode and the second common electrode that are adjacent to each other overlaps corresponding one of the plurality of gate signal lines.

6. The liquid crystal display device according to claim 1, wherein the second substrate further comprises a bridge electrode for connecting adjacent two of the plurality of shield electrodes to each other.

7. The liquid crystal display device according to claim 1, wherein the plurality of shield electrodes are arranged in a grid shape so as to overlap each of the plurality of data signal lines and the plurality of gate signal lines through intermediation of the insulating film.

8. The liquid crystal display device according to claim 1, wherein the plurality of shield electrodes are formed in the same layer as the plurality of pixel electrodes with the same material, and the layer of the plurality of pixel electrodes is a different layer from the layer of the plurality of common electrodes and the material of the pixel electrodes is different from a material of the common electrodes.

9. The liquid crystal display device according to claim 1, wherein the plurality of shield electrodes are formed in a floating state.

10. The liquid crystal display device according to claim 1, further comprising a light shielding material formed on an end portion of each of the plurality of common electrodes.

11. The liquid crystal display device according to claim 1, wherein each of the plurality of pixel electrodes has an aperture portion formed therein.

12. A driving method for a liquid crystal display device including a first substrate on a display surface side and a second substrate on a rear surface side, which are arranged so as to be opposed to each other via liquid crystal, the second substrate comprising a plurality of data signal lines, a plurality of gate signal lines, a plurality of pixels arrayed in a row direction and a column direction, a plurality of pixel electrodes formed individually so as to correspond to the plurality of pixels, respectively, a plurality of common electrodes, formed in a layer that is between a layer in which the liquid crystal is present and respective layers in which the data signal lines and the gate signal lines are present, that extend in one of the column direction and the row direction and are arranged so as to be opposed to the plurality of pixel electrodes, and a plurality of shield electrodes, each of the shield electrodes overlapping, through intermediation of an insulating film, at least one of a respective one of the plurality of data signal lines and a respective one of the plurality of gate signal lines, the shield electrodes being formed in a layer between the layer in which the common electrodes are present and the layer in which the liquid crystal is present, the plurality of common electrodes comprising a first common electrode to which a first voltage is supplied and a second common electrode to which a second voltage different from the first voltage is supplied, the first common electrode and the second common electrode being alternately arranged in one of the row direction and the column direction, wherein, in plan view, each of the plurality of shield electrodes is formed to overlap at least a gap formed between a respective pair of the first common electrode and the second common electrode that are adjacent to each other in the same layer without an intervening electrode between the first and second common electrodes of the pair, when the plurality of shield electrodes overlap the plurality of data signal lines, the plurality of the shield electrodes are disposed between the liquid crystal and the plurality of data signal lines in plan view, when the plurality of shield electrodes overlap the plurality of gate signal lines, the plurality of the shield electrodes are disposed between the liquid crystal and the plurality of gate signal lines in plan view, and wherein the second substrate comprises the plurality of gate signal lines, a gate insulating film, the plurality of data signal lines, an organic insulating film, an interlayer insulating film, the plurality of common electrodes, an interlayer insulating film, and the plurality of pixel electrodes and the plurality of shield electrodes formed in the same layer, which are laminated in the stated order from a glass substrate side, the driving method comprising supplying a first voltage to the first common electrode and supplying a second voltage different from the first voltage to the second common electrode.

13. The driving method for a liquid crystal display device according to claim 12, further comprising inverting, for each pixel column, a polarity of a pixel voltage to be applied to each of the plurality of pixels.

14. The driving method for a liquid crystal display device according to claim 13, still further comprising inverting, for every at least one frame, the polarity of the pixel voltage to be applied to each of the plurality of pixels.

15. The driving method for a liquid crystal display device according to claim 12, further comprising inverting, for each pixel row, a polarity of a pixel voltage to be applied to each of the plurality of pixels.

16. The driving method for a liquid crystal display device according to claim 15, still further comprising inverting, for every at least one frame, the polarity of the pixel voltage to be applied to each of the plurality of pixels.

* * * * *